(12) United States Patent
Zeira et al.

(10) Patent No.: US 9,913,108 B2
(45) Date of Patent: Mar. 6, 2018

(54) METHOD AND APPARATUS FOR MANAGING GROUP COMMUNICATIONS

(71) Applicant: INTERDIGITAL PATENT HOLDINGS, INC., Wilmington, DE (US)

(72) Inventors: Eldad M. Zeira, Huntington, NY (US); Lei Wang, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/250,371

(22) Filed: Aug. 29, 2016

(65) Prior Publication Data

US 2016/0373903 A1    Dec. 22, 2016

Related U.S. Application Data

(63) Continuation of application No. 14/673,301, filed on Mar. 30, 2015, now Pat. No. 9,432,098, which is a
(Continued)

(51) Int. Cl.
*H04W 4/00* (2009.01)
*H04W 4/08* (2009.01)
(Continued)

(52) U.S. Cl.
CPC ............ *H04W 4/08* (2013.01); *H04B 7/0417* (2013.01); *H04B 7/0632* (2013.01);
(Continued)

(58) Field of Classification Search
None
See application file for complete search history.

(56) References Cited

U.S. PATENT DOCUMENTS 7,545,732 B2    6/2009   Oh et al.
7,616,610 B2    11/2009  Kuchibhotla et al.
(Continued)

FOREIGN PATENT DOCUMENTS

EP   1641302   3/2006
EP   1718097   11/2006
(Continued)

OTHER PUBLICATIONS

Brueck et al., "Centralized Scheduling for Joint Transmission Coordinated Multi-Point in LTE-Advanced," 2010 International ITG Workshop on Smart Antennas, pp. 177-184, (2010).
(Continued)

*Primary Examiner* — Minh-Trang Nguyen
(74) *Attorney, Agent, or Firm* — Volpe and Koenig, P.C.

(57) ABSTRACT

A method and apparatus for managing group communications are disclosed. A base station may provide multimedia broadcast multicast service (MBMS) data for transmission to groups of wireless transmit/receive units (WTRUs). The WTRUs may be divided into groups based on a respective MBMS service to be received by each respective group. The base station may assign a respective logical channel for the respective MBMS service of each respective group. The base station may then transmit, to one of the groups, a group assignment message indicating physical resources for a transmission of MBMS data for the group's MBMS service. Also, the base station may further transmit MBMS data of the group's MBMS service using the respective logical channel of the group using the indicated physical resources. The physical resources may include subcarriers. Each respective group may have a respective assigned group identification. The base station may be an eNode-B.

17 Claims, 9 Drawing Sheets

Related U.S. Application Data continuation of application No. 13/392,052, filed as application No. PCT/US2010/046648 on Aug. 25, 2010, now Pat. No. 8,995,365.

(60) Provisional application No. 61/236,645, filed on Aug. 25, 2009.

(51) Int. Cl.
| | |
|---|---|
| H04W 72/00 | (2009.01) |
| H04B 7/0417 | (2017.01) |
| H04B 7/06 | (2006.01) |
| H04W 56/00 | (2009.01) |
| H04W 4/06 | (2009.01) |
| H04W 72/04 | (2009.01) |
| H04L 1/16 | (2006.01) |
| H04W 52/24 | (2009.01) |
| H04W 52/32 | (2009.01) |
| H04W 52/48 | (2009.01) |
| H04W 52/50 | (2009.01) |

(52) U.S. Cl.
CPC ............ *H04L 1/1657* (2013.01); *H04W 4/06* (2013.01); *H04W 56/002* (2013.01); *H04W 72/005* (2013.01); *H04W 72/0453* (2013.01); *H04L 1/1692* (2013.01); *H04W 52/246* (2013.01); *H04W 52/325* (2013.01); *H04W 52/48* (2013.01); *H04W 52/50* (2013.01)

(56) References Cited

U.S. PATENT DOCUMENTS

| | | | |
|---|---|---|---|
| 7,734,257 | B2 | 6/2010 | Chen et al. |
| 7,986,672 | B2 | 7/2011 | Tiedemann et al. |
| 8,346,256 | B2 | 1/2013 | Brueck et al. |
| 8,687,607 | B2 | 4/2014 | Casaccia et al. |
| 2003/0005382 | A1 | 1/2003 | Chen et al. |
| 2003/0210668 | A1 | 11/2003 | Malladi et al. |
| 2004/0131075 | A1 | 7/2004 | Sinnarajah et al. |
| 2004/0152458 | A1 | 8/2004 | Hottinen |
| 2005/0066034 | A1* | 3/2005 | Beckmann .......... H04W 72/005 709/226 |
| 2006/0176966 | A1 | 8/2006 | Stewart et al. |
| 2007/0071025 | A1 | 3/2007 | Bergstrom et al. |
| 2007/0113119 | A1 | 5/2007 | Hafed et al. |
| 2007/0174885 | A1 | 7/2007 | Hus et al. |
| 2008/0084844 | A1 | 4/2008 | Reznik et al. |
| 2008/0090583 | A1 | 4/2008 | Wang et al. |
| 2008/0095106 | A1 | 4/2008 | Malladi et al. |
| 2008/0170541 | A1 | 7/2008 | Vartiainen et al. |
| 2008/0261582 | A1 | 10/2008 | Sarkar et al. |
| 2008/0267136 | A1 | 10/2008 | Baker et al. |
| 2009/0023467 | A1 | 1/2009 | Huang et al. |
| 2009/0197630 | A1* | 8/2009 | Ahn .................... H04L 1/0029 455/522 |
| 2009/0245284 | A1 | 10/2009 | Xu et al. |
| 2009/0268676 | A1 | 10/2009 | Wigard et al. |
| 2009/0286468 | A1* | 11/2009 | Kim .................... H04L 1/1816 455/3.03 |
| 2009/0316811 | A1 | 12/2009 | Maeda et al. |
| 2010/0014434 | A1 | 1/2010 | Reznik et al. |
| 2010/0020737 | A1 | 1/2010 | Fukumasa |
| 2010/0097972 | A1* | 4/2010 | Parkvall ................ H04W 48/12 370/312 |
| 2010/0189025 | A1 | 7/2010 | Cheng |
| 2010/0220693 | A1 | 9/2010 | Ho |
| 2010/0226263 | A1 | 9/2010 | Chun et al. |
| 2010/0290407 | A1 | 11/2010 | Uemura |
| 2010/0290418 | A1 | 11/2010 | Nishio et al. |
| 2010/0322176 | A1 | 12/2010 | Chen et al. |
| 2010/0329182 | A1 | 12/2010 | Wigard et al. |
| 2014/0003319 | A1* | 1/2014 | Etemad ................ H04W 28/08 370/312 |

FOREIGN PATENT DOCUMENTS

| | | |
|---|---|---|
| WO | 04/042963 | 5/2004 |
| WO | 04/057898 | 7/2004 |
| WO | 05/018144 | 2/2005 |
| WO | 05/022809 | 3/2005 |
| WO | 05/034397 | 4/2005 |
| WO | 05/079021 | 8/2005 |
| WO | 05/101738 | 10/2005 |
| WO | 06/034747 | 4/2006 |
| WO | 06/034819 | 4/2006 |
| WO | 06/047571 | 5/2006 |
| WO | 06/083140 | 8/2006 |
| WO | 06/088301 | 8/2006 |
| WO | 06/105010 | 10/2006 |
| WO | 08/137864 | 11/2008 |
| WO | 08/155741 | 12/2008 |

OTHER PUBLICATIONS

Dawkins, "Siobhan's Problem: The Coupon Collector Revisited," The American Statistician, vol. 45, No. 1, pp. 76-82 (Feb. 1991).

Digital Video Broadcasting, "Hierarchical Modulation Explained", A Brief Introduction, DVB-T Hierarchical Modulation, (Mar. 2000).

Gesbert et al., "How Much Feedback is Multi-User Diversity Really Worth?" IEEE International Conference on Communications, vol. 1, pp. 234-238, XP010709995 (Jun. 20, 2004).

IEEE Standard for Information technology—Telecommunications and information exchange between systems Local and metropolitan area networks—Specific requirement—Part 11:Wireless LAN Medium Access Control (MAC) and Physical Layer (PHY) Sepcifications—Amendment 5: Enhancements for Higher Throughput, IEEE Std 802.11n-2009 (Sep. 2009).

IEEE Standard for Local and metropolitan area networks; Part 16: Air Interface for Broadband Wireless Access Systems, IEEE Std. 802.16-2009 (May 29, 2009).

LG Electronics, "Enhancements of Cell-FACH State", 3GPP TSG-RAN WG2 #54, R2-062440, (Tallinn, Estonia Aug. 28-Sep. 1, 2006).

LG Electronics, "MBMS on HSDPA", 3GPP TSG RAN WG2 Meeting #51, R2-060583, (Denver Feb. 13-17, 2006).

NEC Group, "Reference signal multiplexing for data-non-associated control signal in EUTRA uplink," 3GPP TSG RAN WG1 Meeting #46bis, R1-062768 (Oct. 9-13, 2006).

Nttdocomo et al., "Data-non-associated L1/L2 Control Channel Structure for E-UTRA Uplink," 3GPP TSG RAN WG1 Meeting #46bis, R1-062741 (Oct. 9-13, 2006).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).

Third Generation Partnership Project, "Technical Specification Group Radio Access Network; Physical channels and mapping of transport channels onto physical channels (FDD) (Release 6)," 3GPP TS 25.211 V6.9.0 (Nov. 2007).

Third Generation Partnership Project, "Technical Specification Group Radio Access Network; Physical channels and mapping of transport channels onto physical channels (FDD) Release 6)," 3GPP TS 25.211 V6.10.0. (Sep. 2009).

Third Generation Partnership Project, "Technical Specification Group Radio Access Network; Physical channels and mapping of transport channels onto physical channels (FDD) (Release 7)," 3GPP TS 25.211 V7.10.0 (Sep. 2010).

Third Generation Partnership Project, "Technical Specification Group Radio Access Network; Physical channels and mapping of

(56) References Cited

OTHER PUBLICATIONS transport channels onto physical channels (FDD) (Release 8)," 3GPP TS 25.211 V8.7.0 (Sep. 2010).
Third Generation Partnership Project, "Technical Specification Group Radio Access Network; Physical channels and mapping of transport channels onto physical channels (FDD) (Release 9)," 3GPP TS 25.211 V9.2.0 (Sep. 2010).
Third Generation Partnership Project, "Technical Specification Group Radio Access Network; Physical channels and mapping of transport channels onto physical channels (FDD) (Release 10)," 3GPP TS 25.211 V10.0.0 (Sep. 2010).
Third Generation Partnership Project, "Technical Specification Group Radio Access Network; Physical channels and mapping of transport channels onto physical channels (FDD) (Release 11)," 3GPP TS 25.211 V11.0.0 (Dec. 2011).
Third Generation Partnership Project, "Technical Specification Group Radio Access Network; Physical layer procedures (FDD) (Release 1999)." 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) Release 5)," 3GPP TS 25.214 V5.11.0 (Jun. 2005).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 7)," 3GPP TS 25.214 V7.17.0 (Dec. 2010).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Medium Access Control (MAC) protocol specification (Release 6)," 3GPP TS 25.321 V6.18.0 (Mar. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)." 3GPP TS 36.300 V11.1.0 (Mar. 2012).
Third Generation Partnership Project, "Technical Specification Group Radio Access Network; Evolved Universal Terrestrial Radio Acess (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA); Physical layer procedures (Release 8)," 3GPP TS 36.213 V8.7.0 (May 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.6.0 (Jun. 2012).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.7.0 (May 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0 (Jun. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.0.0 (Jun. 2009).
Third Generation Partnership Project, "Technical Specification Group Radio Access Network; Physical channels and mapping of transport channels onto physical channels (FDD) (Release 8),"3GPP TS 25.211 V8.4.0 (Mar. 2009).
Third Generation Partnership Project, "Technical Specification Group Radio Access Network; Physical channels and mapping of transport channels onto physical channels (FDD) (Release 7)," 3GPP TS 25.211 V7.7.0 (Mar. 2009).
Third Generation Partnership Project, "Technical Specification Group Radio Access Network; Physical layer procedures (FDD) (Release 7)," 3GPP TS 25.214 V7.12.0 (May 2009).
Third Generation Partnership Project, "Technical Specification Group Radio Access Network; Physical layer procedures (FDD) (Release 11)," 3GPP TS 25.214 V11.2.0 (Jun. 2012).
Third Generation Partnership Project, "Technical Specification Group Radio Access Network; Physical layer procedures (FDD) (Release 9)," 3GPP TS 25.214 V9.8.0 (Mar. 2012).
Third Generation Partnership Project, "Technical Specification Group Radio Access Network; Physical layer procedures (FDD) (Release 8)," 3GPP TS 25.214 V8.13.0 (Mar. 2012).
Third Generation Partnership Project, "Technical Specification Group Radio Access Network; Physical layer procedures (FDD) (Release 10)," 3GPP TS 25.214 V10.6.0 (Mar. 2012).
Third Generation Partnership Project, "Technical Specification Group Radio Access Network; Physical layer procedures (FDD) (Release 8)," 3GPP TS 25.214 V8.6.0 (May 2009).
Third Generation Partnership Project, "Technical Specification Group Radio Access Network; Medium Access Control (MAC) protocol specification (Release 11)," 3GPP TS 25.321 V11.1.0 (Jun. 2012).
Third Generation Partnership Project, "Technical Specification Group Radio Access Network; Medium Access Control (MAC) protocol specification (Release 7)," 3GPP TS 25.321 V7.13.0 (Jun. 2009).

(56) References Cited

OTHER PUBLICATIONS

Third Generation Partnership Project, "Technical Specification Group Radio Access Network; Medium Access Control (MAC) protocol specification (Release 7)," 3GPP TS 25.321 V7.19.0 (Dec. 2010).
Third Generation Partnership Project, "Technical Specification Group Radio Access Network; Medium Access Contrtol (MAC) protocol specification (Release 8)," 3GPP TS 25.321 V8.6.0 (Jun. 2009).
Third Generation Partnership Project, "Technical Specification Group Radio Access Network; Medium Access Control (MAC) protocol specification (Release 10)," 3GPP TS 25.321 V10.6.0 (Jun. 2012).
Third Generation Partnership Project, "Technical Specification Group Radio Access Network; Medium Access Control (MAC) protocol specification (Release 9)," 3GPP TS 25.321 V9.8.0 (Jun. 2012).
Third Generation Partnership Project, "Technical Specification Group Radio Access Network; Medium Access Control (MAC) protocol specification (Release 8)," 3GPP TS 25.321 V8.14.0 (Sep. 2011).
Third Generation Partnership Project, "Technical Specification Group Radio Access Network; Physical channels and mapping of transport channels onto physical channels (FDD) (Release 7),"3GPP TS 25.211 V7.9.0 (Dec. 2009).
Third Generation Partnership Project, "Technical Specification Group Radio Access Network; Physical channels and mapping of transport channels onto physical channels (FDD) (Release 8),"3GPP TS 25.211 V8.6.0 (Dec. 2009).
Third Generation Partnership Project, "Technical Specification Group Radio Access Network; Physical channels and mapping of transport channels onto physical channels (FDD) (Release 9)," 3GPP TS 25.211 V9.1.0 (Dec. 2009).
Third Generation Partnership Project, "Technical Specification Group Radio Access Network; Physical layer procedures (FDD) (Release 7)," 3GPP TS 25.214 V7.15.0 (Mar. 2010).
Third Generation Partnership Project, "Technical Specification Group Radio Access Network; Physical layer procedures (FDD) (Release 8)," 3GPP TS 25.214 V8.9.0 (Mar. 2010).
Third Generation Partnership Project, "Technical Specification Group Radio Access Network; Physical layer procedures (FDD) (Release 9)," 3GPP TS 25.214 V9.2.0 (Mar. 2010).
Third Generation Partnership Project, "Technical Specification Group Radio Access Network; Medium Access Control (MAC) protocol specification (Release 7)," 3GPP TS 25.321 V7.17.0 (Jun. 2010).
Third Generation Partnership Project, "Technical Specification Group Radio Access Network; Medium Access Control (MAC) protocol specification (Release 8)," 3GPP TS 25.321 V8.10.0 (Jun. 2010).
Third Generation Partnership Project, "Technical Specification Group Radio Access Network; Medium Access Control (MAC) protocol specification (Release 9)," 3GPP TS 25.321 V9.3.0 (Jun. 2010).
Third Generation Partnership Project, "Technical Specification Group Radio Access Network; Evolved Universal Terrestrial Radio Access (E-UTRA); Physical layer procedures (Release 9)," 3GPP TS 36.213 V9.2.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).
Third Generation Partnership Project, "Technical Specification Group Radio Access Network; Evolved Univeresal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.6.0 (Jun. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
TSGR2, "Enhanced Cell-FACH State in FDD", RP-060606, (Sep. 2006).
Weisstein, "Stirling Number of the Second Kind," available at http://mathworld.wolfram.com/StirlingNumberoftheSecondKind. html (last visited Dec. 20, 2012).
WIKIPEDIA, "Coupon Collector's Problem," available at http://en.wikipedia.org/wiki/Coupon_collector%27s_problem (last visited Dec. 20, 2012).
Third Generation Partnership Project, "Technical Specification Group Radio Access Network; Evolved Universal Terrestrial Radio Access (E-UTRA); Services provided by the physical layer (Release 8)," 3GPP TS 36.302 V8.2.0 (Jun. 2009).
Third Generation Partnership Project, "Technical Specification Group Radio Access Network; Evolved Universal Terrestrial Radio Access (E-UTRA); Services provided by the physical layer (Release 9)," 3GPP TS 36.302 V9.2.0 (Jun. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).

\* cited by examiner

METHOD AND APPARATUS FOR MANAGING GROUP COMMUNICATIONS

CROSS REFERENCE TO RELATED APPLICATIONS

This application is a continuation of U.S. patent application Ser. No. 14/673,301 filed Mar. 30, 2015, which is a continuation of U.S. patent application Ser. No. 13/392,052 filed Jun. 12, 2012, which issued as U.S. Pat. No. 8,995,365 on Mar. 31, 2015, which is the U.S. National Stage of International Application No. PCT/US2010/046648 filed Aug. 25, 2010, which claims the benefit of U.S. Provisional Application Ser. No. 61/236,645 filed Aug. 25, 2009, the contents of which are hereby incorporated by reference herein.

FIELD OF INVENTION

The present invention is related to wireless communications.

BACKGROUND

Dedicated feedback channels have been introduced to improve performance for multicast services and broadcast services, such as Enhanced Multicast and Broadcast Services (E-MBS) for 802.16m and evolved Multicast Broadcast Multimedia Systems (eMBMS) for $3^{rd}$ Generation Partnership Project (3GPP) High Speed Packet Access (HSPA) and Long Term Evolution (LTE) and to allow the service provider to determine, for example, transmission parameters for various services, including for example, broadcast services.

For dedicated feedback channels, each WTRU may be assigned its own resources for feedback. While it may be possible to reduce WTRU battery consumption by, for example, only transmitting negative acknowledgements, the resources cannot be used for other WTRUs. Moreover, while this method allows the base station to know the exact identity of the WTRU, providing feedback for a large number of WTRUs requires a prohibitive amount of uplink resources.

SUMMARY

A method and an apparatus for managing group communications are disclosed. The example methods disclose forming subscriber groups, signaling of group assignments, grouping physical channels, assigning logical or physical channels to subscriber groups, and defining triggers for activating channels.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1A:
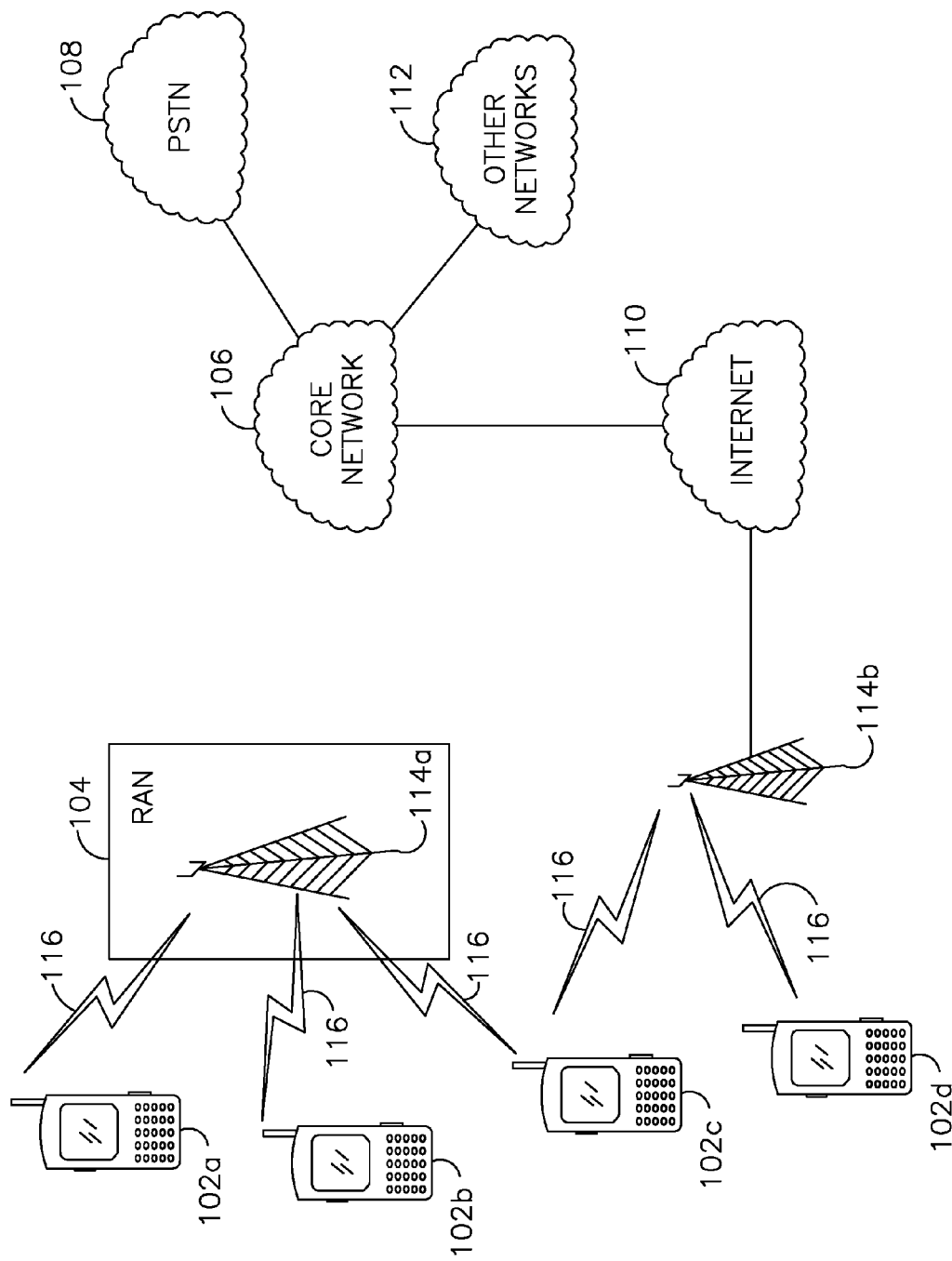
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
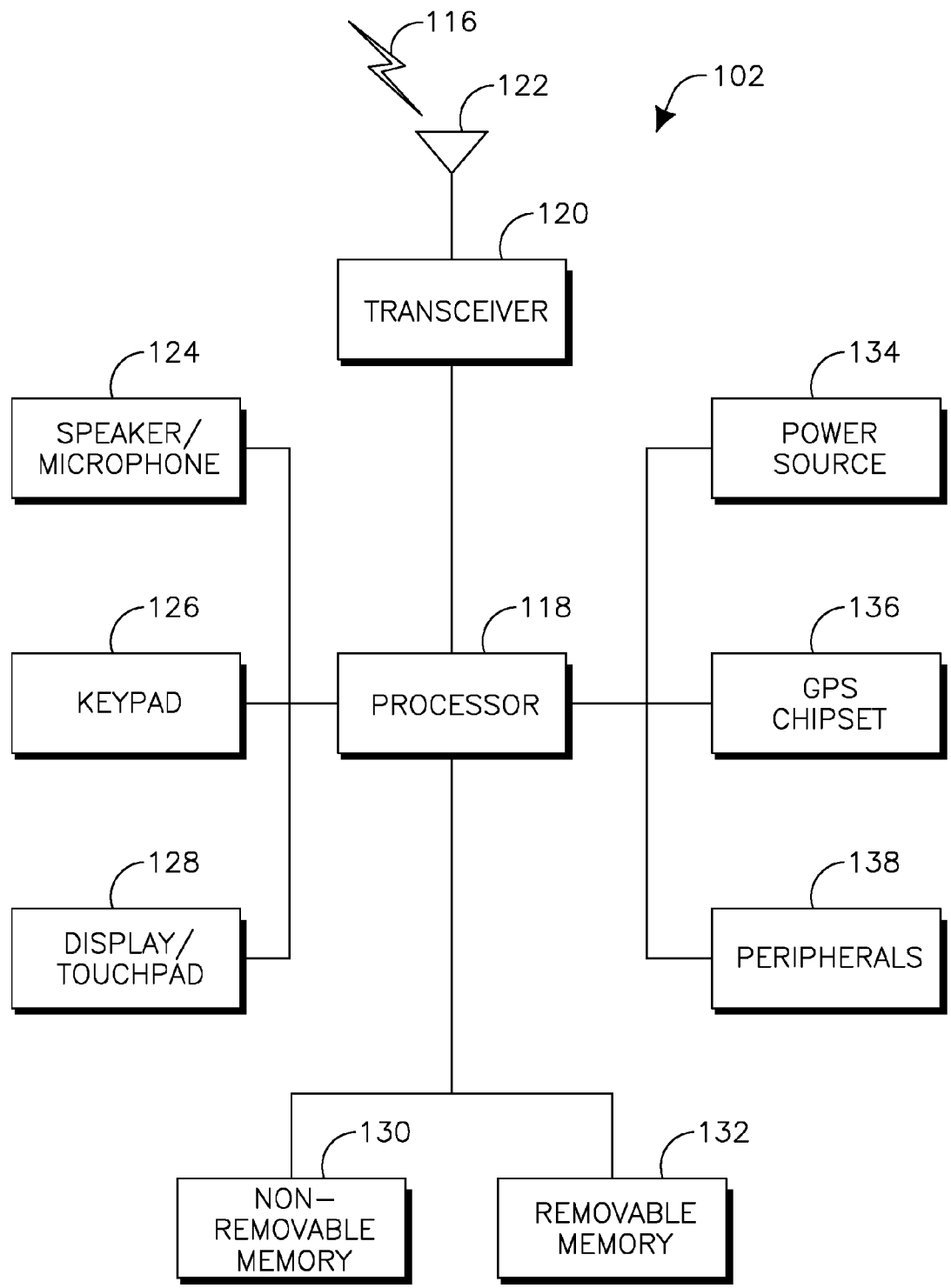
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2A:
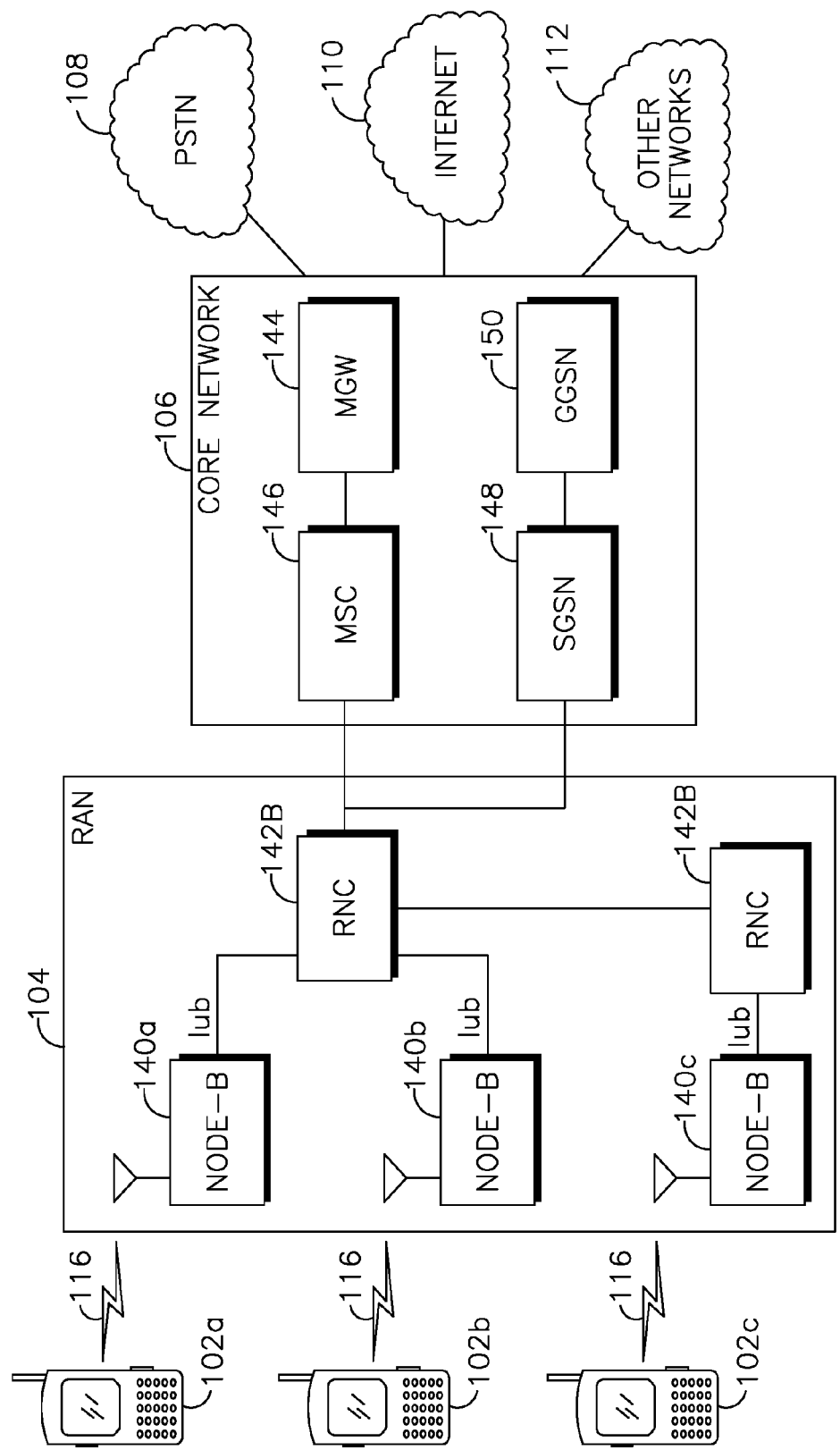
FIG. 2A is a system diagram of an example radio access network and an example core network that may be used within the communications system illustrated in FIG. 1A.

FIG. 2A is a system diagram of a RAN 204 and a core network 206 according to an embodiment. A RAN 204 may employ a UTRA radio technology to communicate with WTRUs 202a, 202b, 202c over an air interface 216. The RAN 204 may also be in communication with the core network 206. As shown in FIG. 2A, the RAN 204 may include Node-Bs 240a, 240b, 240c, which may each include one or more transceivers for communicating with the WTRUs 202a, 202b, 202c over the air interface 216. The Node-Bs 240a, 240b, 240c may each be associated with a particular cell (not shown) within the RAN 204. The RAN 204 may also include RNCs 242a, 242b. It will be appreciated that the RAN 204 may include any number of Node-Bs and RNCs while remaining consistent with an embodiment.

As shown in FIG. 2A, the Node-Bs 240a, 240b may be in communication with the RNC 242a. Additionally, the Node-B 240c may be in communication with the RNC 242b. The Node-Bs 240a, 240b, 240c may communicate with the respective RNCs 242a, 242b via an Iub interface. The RNCs 242a, 242b may be in communication with one another via an Iur interface. Each of the RNCs 242a, 242b may be configured to control the respective Node-Bs 240a, 240b, 240c to which it is connected. In addition, each of the RNCs 242a, 242b may be configured to carry out or support other functionality, such as outer loop power control, load control, admission control, packet scheduling, handover control, macrodiversity, security functions, data encryption, and the like.

The core network 206 shown in FIG. 2A may include a media gateway (MGW) 244, a mobile switching center (MSC) 246, a serving GPRS support node (SGSN) 248, and/or a gateway GPRS support node (GGSN) 250. While each of the foregoing elements are depicted as part of a core network 206, it will be appreciated that any one of these elements may be owned and/or operated by an entity other than the core network operator.

The RNC 242a in the RAN 204 may be connected to the MSC 246 in the core network 206 via an IuCS interface. The MSC 246 may be connected to the MGW 244. The MSC 246 and the MGW 244 may provide the WTRUs 202a, 202b, 202c with access to circuit-switched networks, such as the PSTN 208, to facilitate communications between the WTRUs 202a, 202b, 202c and traditional land-line communications devices.

The RNC 242a in the RAN 204 may also be connected to the SGSN 248 in the core network 206 via an IuPS interface. The SGSN 248 may be connected to the GGSN 250. The SGSN 248 and the GGSN 250 may provide the WTRUs 202a, 202b, 202c with access to packet-switched networks, such as the Internet 210, to facilitate communications between and the WTRUs 202a, 202b, 202c and IP-enabled devices.

As noted above, the core network 206 may also be connected to the networks 212, which may include other wired or wireless networks that are owned and/or operated by other service providers.

Figure 2B:
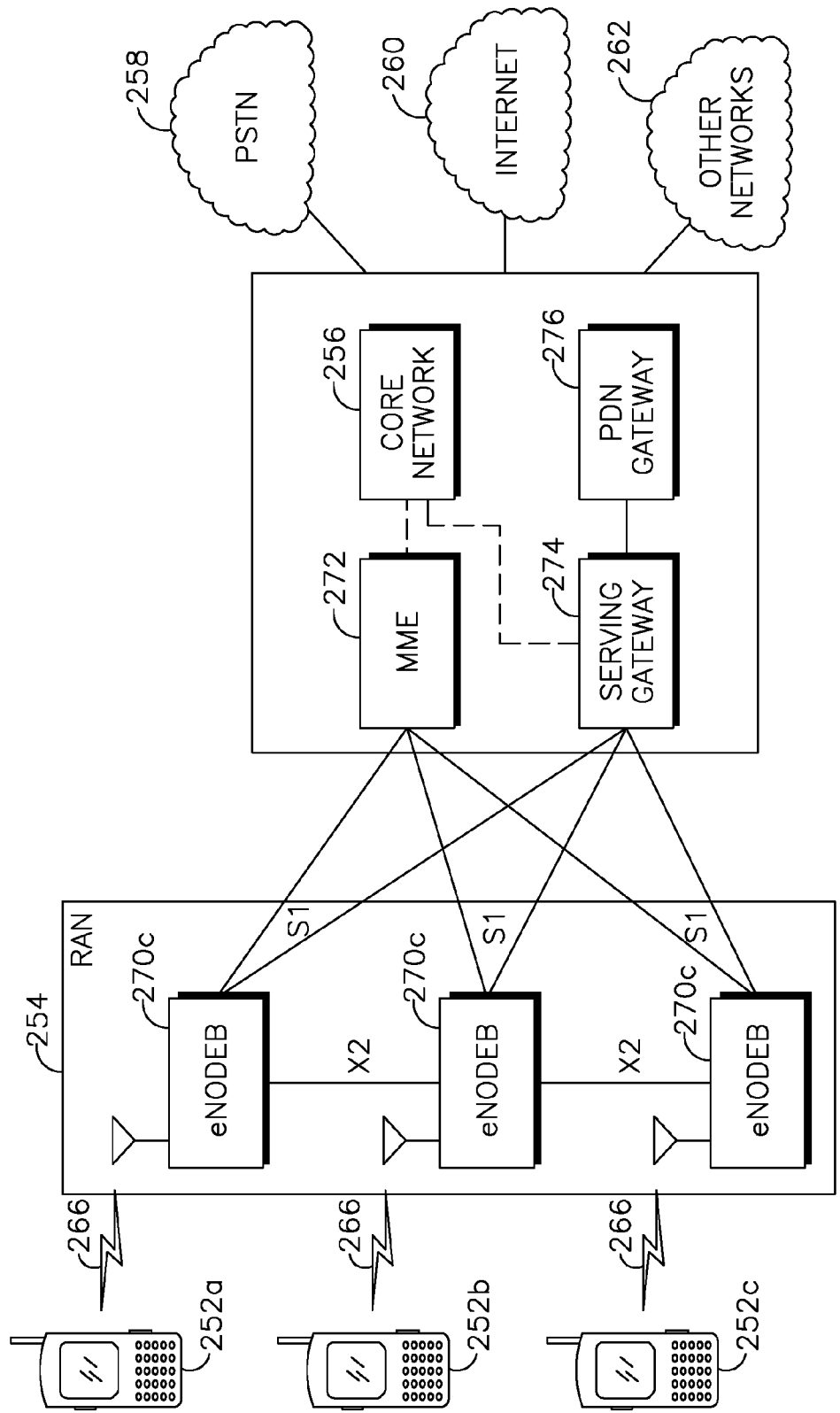
FIG. 2B is another system diagram of an example radio access network and an example core network that may be used within the communications system illustrated in FIG. 1A.

FIG. 2B is a system diagram of a RAN 254 and a core network 256 according to another embodiment. The RAN 254 may employ an E-UTRA radio technology to communicate with the WTRUs 252a, 252b, 252c over the air interface 266. The RAN 254 may also be in communication with the core network 256.

The RAN 254 may include eNode-Bs 270a, 270b, 270c, though it will be appreciated that the RAN 254 may include any number of eNode-Bs while remaining consistent with an embodiment. The eNode-Bs 270a, 270b, 270c may each include one or more transceivers for communicating with the WTRUs 252a, 252b, 252c over the air interface 266. In one embodiment, the eNode-Bs 270a, 270b, 270c may implement MIMO technology. Thus, the eNode-B 270a, for example, may use multiple antennas to transmit wireless signals to, and receive wireless signals from, the WTRU 252a.

Each of the eNode-Bs 270a, 270b, 270c may be associated with a particular cell (not shown) and may be configured to handle radio resource management decisions, handover decisions, scheduling of users in the uplink and/or downlink, and the like. As shown in FIG. 2B, the eNode-Bs 270a, 270b, 270c may communicate with one another over an X2 interface.

The core network 256 shown in FIG. 2B may include a mobility management gateway (MME) 272, a serving gateway 274, and a packet data network (PDN) gateway 276. While each of the foregoing elements are depicted as part of the core network 256, it will be appreciated that any one of these elements may be owned and/or operated by an entity other than the core network operator.

The MME 272 may be connected to each of the eNode-Bs 270a, 270b, 270c in the RAN 254 via an S1 interface and may serve as a control node. For example, the MME 272 may be responsible for authenticating users of the WTRUs 252a, 252b, 252c, bearer activation/deactivation, selecting a particular serving gateway during an initial attach of the WTRUs 252a, 252b, 252c, and the like. The MME 272 may also provide a control plane function for switching between the RAN 254 and other RANs (not shown) that employ other radio technologies, such as GSM or WCDMA.

The serving gateway 274 may be connected to each of the eNode Bs 270a, 270b, 270c in the RAN 254 via the S1 interface. The serving gateway 274 may generally route and forward user data packets to/from the WTRUs 252a, 252b, 252c. The serving gateway 274 may also perform other functions, such as anchoring user planes during inter-eNode B handovers, triggering paging when downlink data is available for the WTRUs 252a, 252b, 252c, managing and storing contexts of the WTRUs 252a, 252b, 252c, and the like.

The serving gateway 274 may also be connected to the PDN gateway 146, which may provide the WTRUs 252a, 252b, 252c with access to packet-switched networks, such as Internet 260, to facilitate communications between the WTRUs 252a, 252b, 252c and IP-enabled devices.

The core network 256 may facilitate communications with other networks. For example, the core network 256 may provide the WTRUs 252a, 252b, 252c with access to circuit-switched networks, such as the PSTN 258, to facilitate communications between the WTRUs 252a, 252b, 252c and traditional land-line communications devices. For example, the core network 256 may include, or may communicate with, an IP gateway (e.g., an IP multimedia subsystem (IMS) server) that serves as an interface between the core network 106 and the PSTN 258. In addition, the core network 256 may provide the WTRUs 252a, 252b, 252c with access to the networks 262, which may include other wired or wireless networks that are owned and/or operated by other service providers.

Figure 2C:
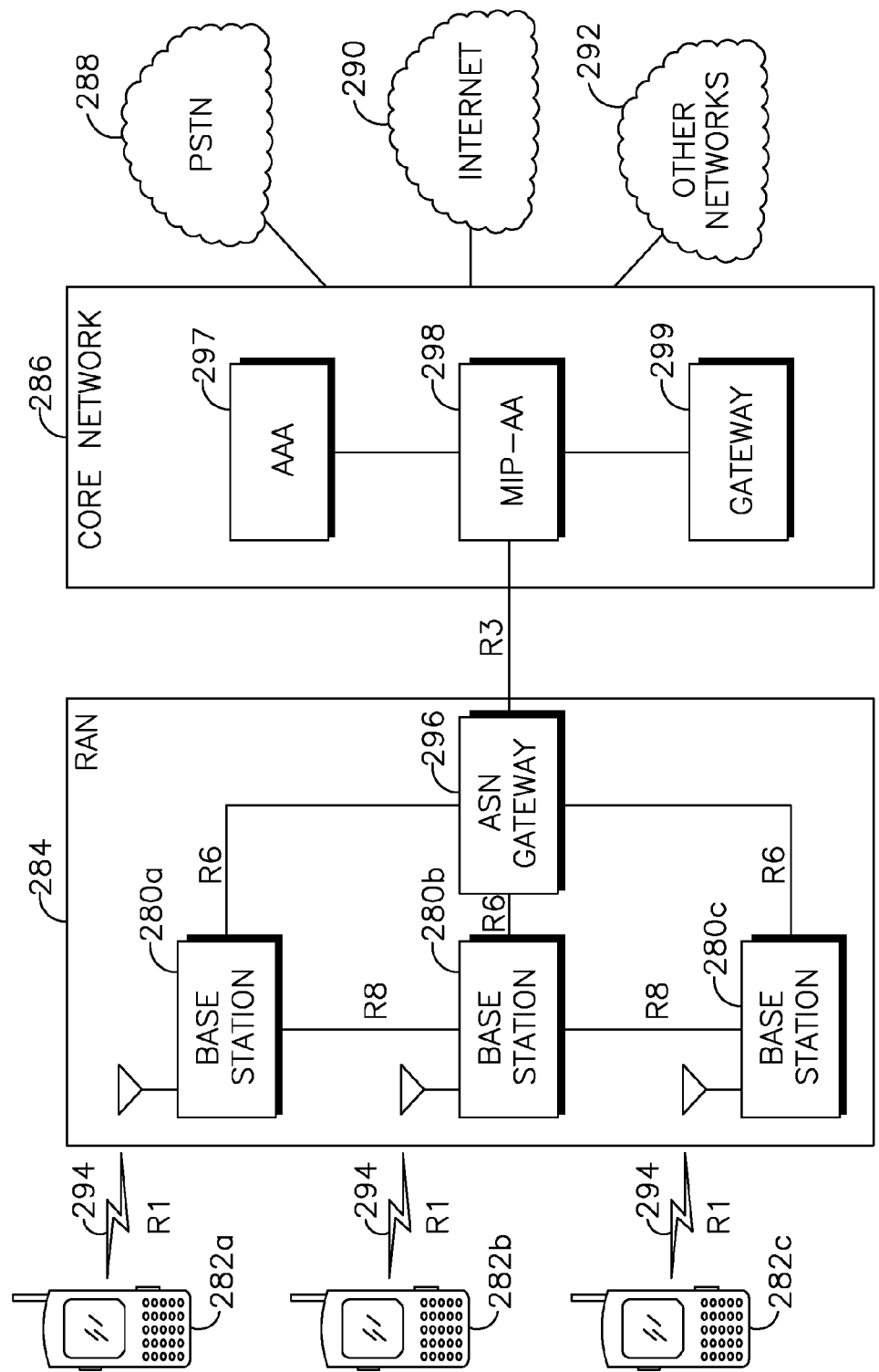
FIG. 2C is yet another system diagram of an example radio access network and an example core network that may be used within the communications system illustrated in FIG. 1A.

FIG. 2C is a system diagram of the RAN 284 and a core network 286 according to another embodiment. The RAN 284 may be an access service network (ASN) that employs IEEE 802.16 radio technology to communicate with the WTRUs 282a, 282b, 282c over an air interface 294. As will be further discussed below, the communication links between the different functional entities of the WTRUs 282a, 282b, 282c, the RAN 284, and the core network 286 may be defined as reference points.

As shown in FIG. 2C, the RAN 284 may include base stations 280a, 280b, 280c, and an ASN gateway 296, though it will be appreciated that the RAN 284 may include any number of base stations and ASN gateways while remaining consistent with an embodiment. The base stations 280a, 280b, 280c may each be associated with a particular cell (not shown) in the RAN 284 and may each include one or more transceivers for communicating with the WTRUs 282a, 282b, 282c over the air interface 294. In one embodiment, the base stations 280a, 280b, 280c may implement MIMO technology. Thus, the base station 280a, for example, may use multiple antennas to transmit wireless signals to, and receive wireless signals from, the WTRU 282a. The base stations 280a, 280b, 280c may also provide mobility management functions, such as handoff triggering, tunnel establishment, radio resource management, traffic classification, quality of service (QoS) policy enforcement, and the like. The ASN gateway 296 may serve as a traffic aggregation point and may be responsible for paging, caching of subscriber profiles, routing to the core network 286, and the like.

The air interface 294 between the WTRUs 282a, 282b, 282c and the RAN 284 may be defined as an R1 reference point that implements the IEEE 802.16 specification. In addition, each of the WTRUs 282a, 282b, 282c may establish a logical interface (not shown) with the core network 286. The logical interface between the WTRUs 282a, 282b, 282c and the core network 286 may be defined as an R2 reference point, which may be used for authentication, authorization, IP host configuration management, and/or mobility management.

The communication link between each of the base stations 280a, 280b, 280c may be defined as an R8 reference point that includes protocols for facilitating WTRU handovers and the transfer of data between base stations. The communication link between the base stations 280a, 280b, 280c and the ASN gateway 296 may be defined as an R6 reference point. The R6 reference point may include protocols for facilitating mobility management based on mobility events associated with each of the WTRUs 282a, 282b, 282c.

As shown in FIG. 2C, the RAN 284 may be connected to the core network 286. The communication link between the RAN 284 and the core network 286 may defined as an R3 reference point that includes protocols for facilitating data transfer and mobility management capabilities, for example. The core network 286 may include a mobile IP home agent (MIP-HA) 298, an authentication, authorization, accounting (AAA) server 297, and a gateway 299. While each of the foregoing elements are depicted as part of the core network 286, it will be appreciated that any one of these elements may be owned and/or operated by an entity other than the core network operator.

The MIP-HA 298 may be responsible for IP address management, and may enable the WTRUs 282a, 282b, 282c to roam between different ASNs and/or different core networks. The MIP-HA 298 may provide the WTRUs 282a, 282b, 282c with access to packet-switched networks, such as the Internet 110, to facilitate communications between the WTRUs 282a, 282b, 282c and IP-enabled devices. The AAA server 297 may be responsible for user authentication and for supporting user services. The gateway 299 may facilitate interworking with other networks. For example, the gateway 299 may provide the WTRUs 282a, 282b, 282c with access to circuit-switched networks, such as the PSTN 288, to facilitate communications between the WTRUs 282a, 282b, 282c and traditional land-line communications devices. In addition, the gateway 299 may provide the WTRUs 282a, 282b, 282c with access to the networks 292, which may include other wired or wireless networks that are owned and/or operated by other service providers.

Although not shown in FIG. 2C, it will be appreciated that the RAN 284 may be connected to other ASNs and the core network 286 may be connected to other core networks. The communication link between the RAN 284 the other ASNs may be defined as an R4 reference point, which may include protocols for coordinating the mobility of the WTRUs 282a, 282b, 282c between the RAN 284 and the other ASNs. The communication link between the core network 106 and the other core networks may be defined as an R5 reference, which may include protocols for facilitating interworking between home core networks and visited core networks.

In general, a WTRU may include a transmitter, a receiver, a decoder, a CQI measurement unit, a memory, a controller, and an antenna. The memory is provided to store software including operating system, application, etc. The controller is configured to perform a method of sending feedback for a downlink shared service. The receiver and the transmitter are in communication with the controller. The antenna is in communication with both the transmitter and the receiver to facilitate the transmission and reception of wireless data.

The receiver receives signals from a Node-B. The decoder decodes the received signal from the Node-B. The decoder may decode a high speed shared control channel (HS-SCCH) signal while the WTRU is in a Cell_FACH state. The decoder may decode a downlink transmission on a high speed physical downlink shared channel (HS-PDSCH) if the WTRU 100 successfully decodes an identity (ID) of the WTRU on the signal on the HS-SCCH. The transmitter sends feedback, (i.e., a CQI or an acknowledgement based on the decoding of the downlink transmission), to a Node-B via a contention-based shared feedback channel, which will be explained in detail below. The CQI measurement unit outputs a CQI, which will be explained in detail below.

In general, a Node-B includes a encoder, a transmitter, a receiver, a controller, and an antenna. The controller is configured to perform a method of estimating a number of WTRUs in a cell. The transmitter and the receiver are in communication with the controller. The antenna is in communication with both the transmitter and the receiver to facilitate the transmission and reception of wireless data.

The encoder encodes data stream(s) for transmission. The transmitter sends a downlink transmission including the encoded data stream(s) for a downlink shared service to a plurality of WTRUs via a downlink shared channel. The controller controls a downlink transmit power and/or an MCS on the downlink shared channel so that the downlink transmissions are transmitted to the WTRUs with a high likelihood of success of being received. The receiver receives feedback from the WTRUs via a contention-based shared feedback channel.

In general, subscribers to a certain service may use a common feedback channel to send a pre-defined signal upon meeting certain conditions that may include errors, signal levels, or a response to polling (for counting purposes). This may be further conditioned on the success of an experiment with a prescribed probability. In all of these cases it is assumed that it isn't essential that the base station knows the identity or the exact number of wireless transmit/receive units (WTRUs) that have signaled on the common channel, rather a rough estimate of the number of WTRUs or even the mere fact that one or more WTRUs have done so may suffice.

The common feedback channel may be a physical channel that carries one bit, where the logical meaning of the bit may be defined by the base station. It may be constructed such that an event of 2 or more WTRUs signaling the same channel at the same time may be interpreted by the base station as "one or more". One or more physical channels may be grouped into a logical channel.

Figure 3:
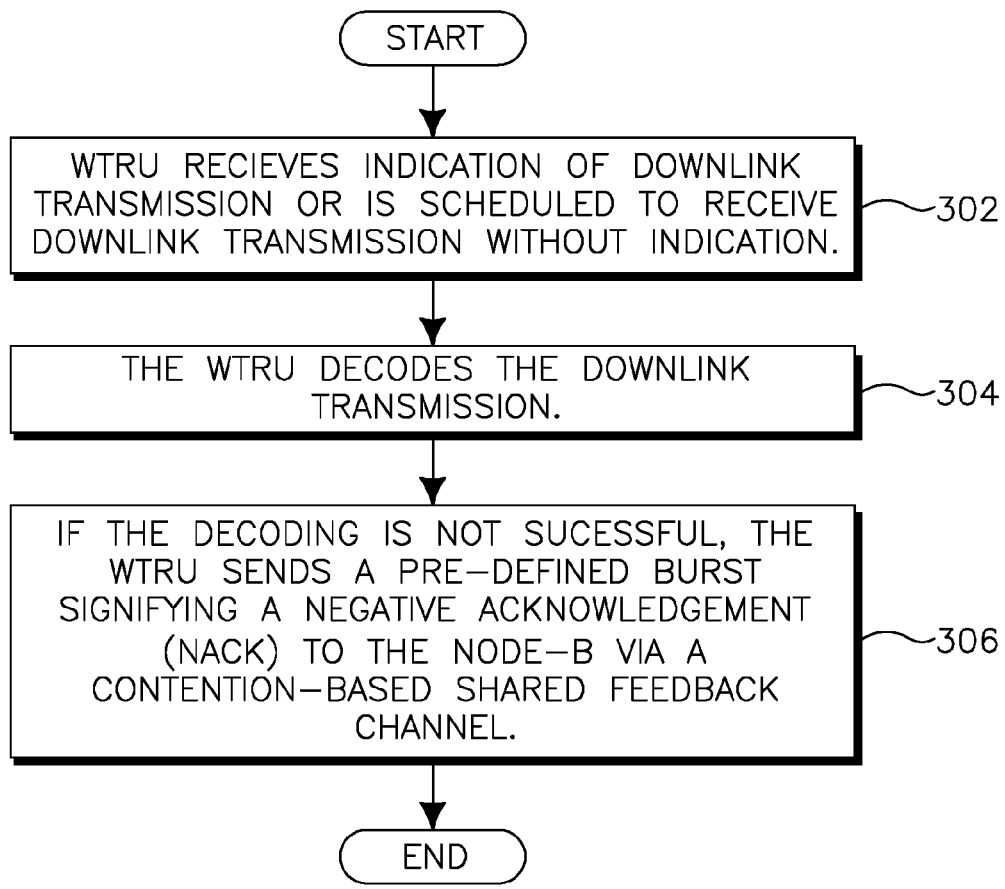
FIG. 3 is a flow diagram of a process for providing feedback for a downlink shared service via a downlink shared channel in accordance with one embodiment.

FIG. 3 is a flow diagram of a process 300 for providing feedback for a downlink shared service via a downlink shared channel in accordance with one embodiment. A WTRU is scheduled to receive a downlink transmission via a downlink shared channel for a downlink shared service that is provided to a plurality of WTRUs from a Node-B (302). The WTRU decodes the downlink transmission (304). If the decoding is not successful, the WTRU sends a pre-defined burst signifying a negative acknowledgement (NACK) to the Node-B via a contention-based shared feedback channel (306). The pre-defined burst may be sent only once without requiring an acknowledgement from the Node-B. If the decoding is successful, the WTRU does not send feedback, (i.e., an ACK is implicit).

An uplink shared feedback channel, a physical random access feedback channel (P-RAFCH), is introduced for sending the feedback from the WTRU to the Node-B. The P-RAFCH is a contention-based random access channel. For example, at least one P-RAFCH may be associated with each HS-SCCH in the downlink. If several downlink shared services are supported over the HS-PDSCH(s), a set of P-RAFCHs are provided for the downlink shared services and each P-RAFCH may be dedicated to a particular downlink shared service or a group of services.

The configuration of the shared feedback channel, (i.e., P-RAFCH), may be broadcast via system information block (SIB) and may vary cell-by-cell. Alternatively, the shared feedback channel configuration may be signaled through dedicated signaling to the WTRUs that have a connection to the radio access network (RAN), (e.g., WTRUs operating in a CELL_FACH state or active/connected states). If e.g. CDMA codes are used then the Node-B broadcasts available codes and access slots/sub-frames and/or sub-carriers for the shared feedback channel. The access slot duration may be the same as for the conventional RACH, and may be matched, (i.e., derived), to the transmission time interval (TTI) of the downlink shared services. When a WTRU needs to provide feedback, and based on the broadcast or unicast parameters above, the WTRU randomly selects a physical resource, (e.g., a code and an access slot), associated with a particular TTI on a particular downlink shared service and sends its feedback.

It should be noted that the P-RAFCH may be defined by a combination of any physical resources including, but not limited to, code, subcarrier, time, space, etc., and the exact definition of the P-RAFCH physical resource is not essential to the embodiments disclosed herein.

In transmission of the feedback, (i.e., the pre-defined burst), no transmit power ramp-up mechanism is used in contrast to the conventional RACH. The WTRU may send each feedback only once and does not require acknowledgement of its receipt from the Node-B. The transmit power for the feedback may be determined based on the received power measured on a reference channel, (e.g., common pilot channel (CPICH), HS-PDSCH, etc.), and a network-supplied offset. The offset value may be broadcast. Alternatively, the network may instruct the WTRU to use an absolute power, and provides a rule when the WTRU is allowed to provide feedback. For example, the WTRU may be permitted to send feedback only if the received reference channel power is above a pre-defined value.

If the WTRU has selected a Node-B out of several synchronized Node-Bs which transmit the same downlink transmission, the WTRU transmits a NACK only to that selected Node-B. If the WTRU performs soft combining of signals from a plurality of Node-Bs in an active set, the WTRU sends a NACK to the strongest Node-B in the active set.

The WTRU may send a NACK each time the WTRU fails to decode the downlink transmission. Alternatively, the WTRU may send a NACK after two or more successive downlink transmissions have failed. For example, the WTRU may send a NACK only if m out of n successive transmissions have failed. The numbers m and n may be determined by the network. For the purpose of counting m out of n, original transmissions, re-transmissions, both, or relative combination of both may be counted. The ability to actually send the NACK may depend on some random number with probability set by the network. The network may indicate desired transmission of the NACK on a cell or group of cells different from the one where the downlink shared service, (e.g., MBMS), is received. The cells are indicated by the network.

In one embodiment, the feedback may be anonymous. If the feedback goes through, the Node-B knows that some WTRU in the cell was not able to decode the downlink transmission in a particular instance (TTI or sub-frame). Alternatively, the WTRU ID may be signaled. In accordance with one embodiment, the downlink shared service may be mapped to a WTRU-specific signature code that will be transmitted as the payload of the P-RAFCH. In accordance with another embodiment, a WTRU connection ID may be signaled along with the feedback. In accordance with yet another embodiment, the access opportunities to the contention-based shared feedback channel may be mapped to the downlink shared service so that the WTRU ID may be verified based on the predefined mapping. The mapping may be transmitted by the network.

The Node-B calibrates the transmit power and/or adjusts an MCS of the downlink shared channel carrying the shared downlink service so that it covers the desired coverage area, (i.e., cell or a sector of a cell), with a high likelihood. With the transmit power and/or MCS adjustment, the probability that a WTRU will not receive the downlink data in a TTI can be set to a desired operating point, preferably near zero. Since a WTRU sending a NACK is almost certainly at the edge of the cell or sector, the downlink power computation should be done under this assumption. Since the Node-B knows the cell or sector size, the Node-B 120 may configure the downlink transmit power and/or MCS so that it does not significantly interfere with other signals. Consequently, only very few WTRUs may need to send a NACK for any single TTI. With this approach where feedback power is fixed, a rule may be set to prohibit WTRUs from sending feedback.

Since a WTRU sending a NACK is almost certainly at the edge of the cell or sector, the uplink transmit power on the shared feedback channel, (e.g., P-RAFCH), may be determined under this assumption. Since the Node-B 120 knows the cell or sector size, the Node-B 120 configures the uplink transmit power such that it does not significantly interfere with other signals at the Node-B 120.

Under the above assumption, (very few NACKs expected per TTI), the Node-B 120 may allocate enough shared feedback channel resources so that the probability of collision for a NACK is kept low and the Node-B 120 is able to receive a large number of NACKs without severely impacting the uplink capacity. However this disclosure provides means to schedule feedback from potentially a very large number of WTRUs.

If the Node-B 120 receives at least one NACK, the Node-B 120 may for example schedule a retransmission for which the NACK is received and/or change the coding and modulation characteristics of subsequent transmissions. In this way, the HS-PDSCH operates as it conventionally does under normal HSDPA operation. Packet delivery is guaranteed to the same extent as it is guaranteed under the current HARQ, (i.e., subject to a maximum limit on re-transmissions and errors in the feedback of NACKs).

The Node-B may maintain a threshold value and retransmit the downlink transmission only if the number of NACKs from the WTRUs exceeds the threshold value. While data delivery is not guaranteed, it is guaranteed that no more than a few WTRUs are unhappy. This limits the impact on the downlink shared service throughput of a small number of WTRUs. Alternatively, the Node-B 120 may ignore the NACKs. The Node-B 120 may allocate no resources to the shared feedback channel to obtain the same result.

The Node-B 120 may pool the NACKs, (i.e., keep track of data that needs retransmission), and retransmit multiple downlink transmissions at a later time as a single packet. In this case, a sequence number and buffering may need to be extended.

The Node-B 120 may implement the following downlink power control mechanism for the HS-PDSCH. Let $P_n$ be the HS-PDSCH power reference, (i.e., power per bit), for TTI n. If a NACK is received, the Node-B 120 may set the transmit power reference for TTI (n+1) as follows:

$$P_{n+1} = P_n + f(\text{num. of NACKs})\Delta_{NACK}; \text{ or} \qquad \text{Equation (1)}$$

$$P_{n+1} = P_{MAX}. \qquad \text{Equation (2)}$$

If the Node-B 120 receives no NACKs, the Node-B 120 may set the transmit power reference for TTI (n+1) as follows:

$$P_{n+1} = P_n - \Delta_{ACK}. \qquad \text{Equation (3)}$$

Figure 4:
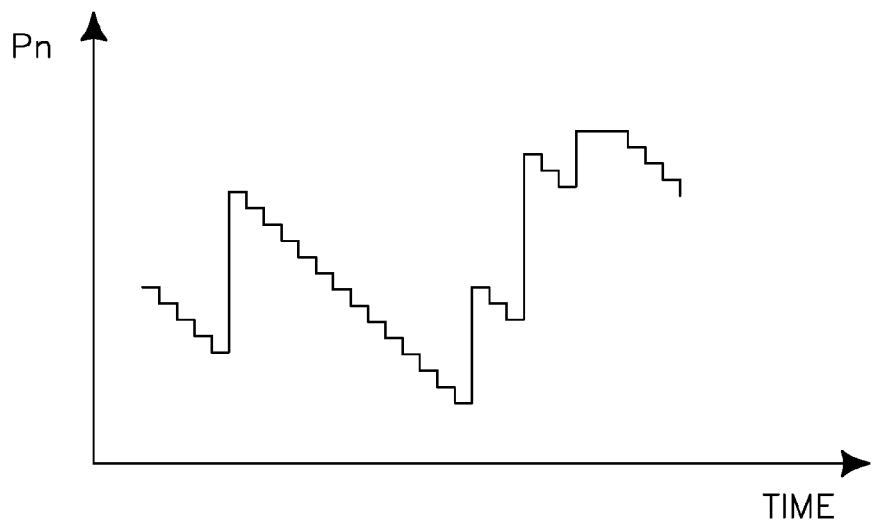
FIG. 4 shows one possible power variation scheme of an HS-PDSCH.

Here, $\Delta_{ACK}, \Delta_{NACK} > 0$, f( ) is a positive non-decreasing (but may be constant) function of its argument. If the Node-B 120 does not receive any NACKs, the Node-B 120 may bring the transmit power reference down by a pre-defined decrement. As soon as a NACK is received, the transmit power reference may be increased by a pre-defined increment. The pre-defined increment and decrement may or may not be the same. The increase may depend on the number of NACKs received (but may also be constant). The ratio of increment f(num. of NACKs)$\Delta_{NACK}$ and decrement $\Delta_{ACK}$ preferably depends on the expected probability of NACK. FIG. 4 shows one possible power variation scheme of an HS-PDSCH.

The actual transmit power in TTI n depends on $P_n$ and the data format selected for the data, as it does conventionally. Additionally, a maximum and a minimum power may be set to limit the actual transmit power.

In addition to, or as an alternative to, the transmit power control, the Node-B 120 may adjust an MCS of the downlink shared service in a similar fashion. When no NACK is received, the Node-B 120 may increase the MCS order, and when at least one NACK is received, the Node-B 120 may lower the MCS order.

For both power control and MCS control, the Node-B 120 may consider the resources allocated to other services in determining the range of possible transmit power and MCS. For instance, if the load created by other services is low, the Node-B 120 may increase its transmission power and/or reduce the MCS utilized for the downlink shared services, which allows more WTRUs to decode the service.

When the Node-B 120 needs to know how many WTRUs are listening to the downlink shared service, the Node-B 120 may poll them by temporarily, (e.g., one (1) TTI), request all WTRUs to send NACKs. For this, the Node-B 120 may send a special burst or a data sequence with intentionally erroneous CRC check. This will force all WTRUs to respond with a NACK. The Node-B 120 counts the number of received NACKs, making allowances for losses due to fading and collisions. Not only does this provide a count that should be approximately correct, but if the NACK power is "absolute", (as opposed to relative to a received power), a distribution of uplink channel qualities is also obtained.

Figure 5:
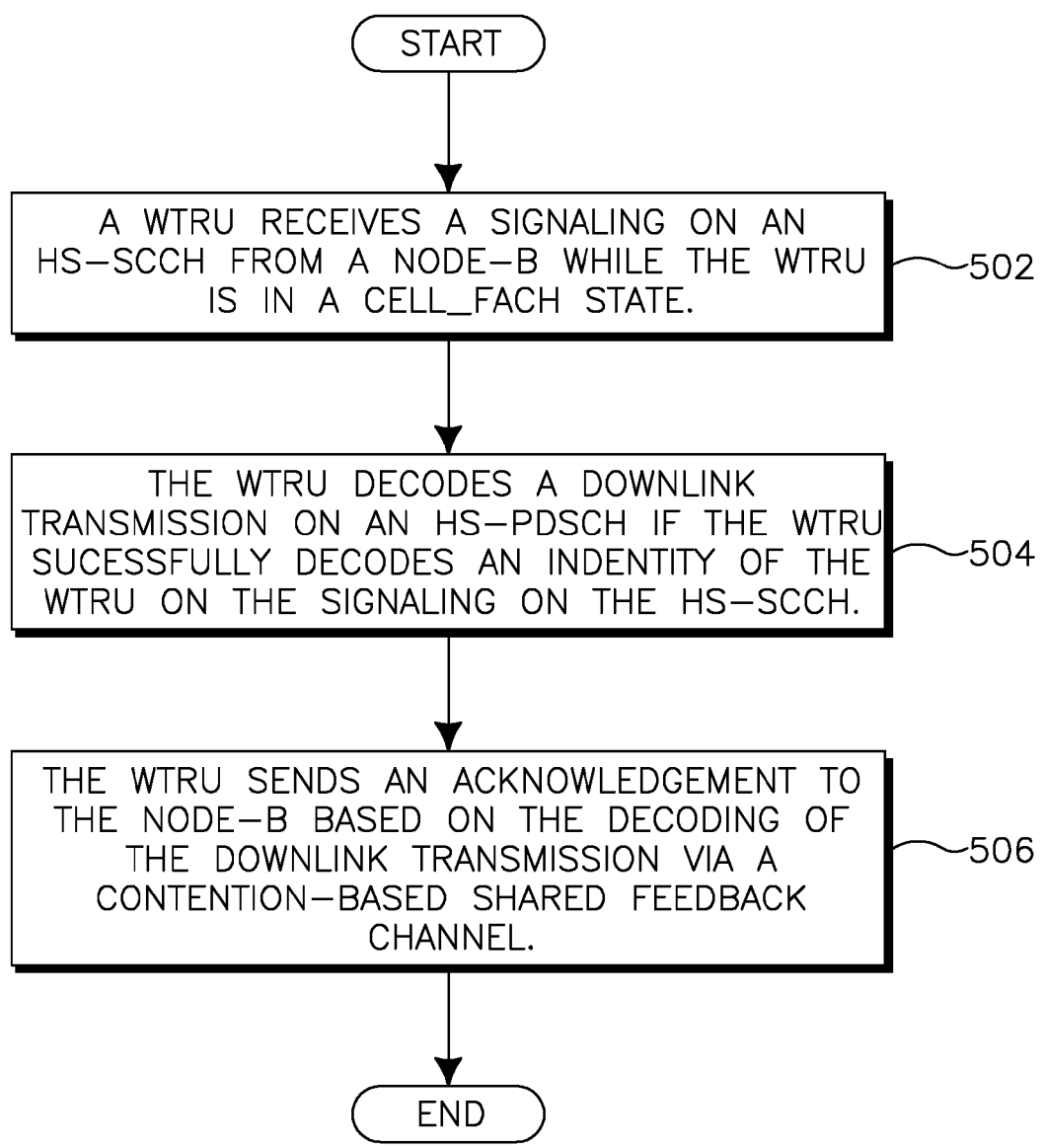
FIG. 5 shows an example flow diagram of a process for providing feedback for a downlink shared service transmitted to a plurality of WTRUs via HSDPA in accordance with another embodiment.

FIG. 5 is a flow diagram of an example process 500 for providing feedback for downlink shared services to WTRUs via HSDPA in accordance with another embodiment. A WTRU receives signaling on an HS-SCCH from a Node-B while the WTRU is in a Cell_FACH state (502). The WTRU decodes a downlink transmission on an HS-PDSCH if the WTRU successfully decodes an identity of the WTRU on the signaling on the HS-SCCH (504). The WTRU sends an acknowledgement to the Node-B based on the decoding of the downlink transmission via a contention-based shared feedback channel (506). The transmission on the shared feedback channel and the signaling on the HS-SCCH have a fixed timing relationship. Shared downlink transmission may also be scheduled in advance e.g. by broadcast of its parameters without the need for specific signaling.

One shared feedback channel may comprise one scrambling code and one channelization code, (or alternatively any combination of physical resources), in the uplink. At least one shared feedback channel is associated with each HS-SCCH in the downlink. The shared feedback channel is shared amongst all WTRUs in a CELL_FACH that are requested to monitor the associated HS-SCCH.

Another example of a 1-bit common feedback channel is one code on OFDMA sub-carriers. Multiple codes may be defined that provide multiple feedback channels. The codes may or may not be orthogonal.

Transmission over the shared feedback channel by different WTRUs may be time multiplexed, and follow a timing restriction with respect to the signaling over the HS-SCCH. More specifically, a WTRU transmits an ACK or NACK message over the associated shared feedback channel at a fixed time interval after having successfully decoded its WTRU ID, (i.e., high speed radio network temporary identity (H-RNTI)) over the HS-SCCH. The duration of the time interval should be set such that it is long enough for the WTRU to receive and decode the data on the HS-PDSCH and evaluate whether there was an error, (i.e., cyclic redundancy check (CRC) verification), yet short enough to allow the Node-B to quickly retransmit an erroneous transport block as part of the HARQ processing. There needs to be a one to one mapping between the downlink transmission and the feedback.

The information and parameters related to the shared feedback channel may be signaled to the WTRU at the same time as HS-SCCH-related information is signaled, either through an SIB over the broadcast control channel (BCCH)/broadcast channel (BCH) or through dedicated RRC or other signaling, (e.g., new information element (IE) in the RRC CONNECTION SETUP message).

The transmission power at which a WTRU sends the feedback may be set based on the received power measured on a reference channel, (e.g., CPICH, HS-PDSCH, etc.), and a network-supplied offset value. The offset value may be part of the SIB. Alternatively, the network may instruct the WTRU to use an absolute power, but provides a rule when the WTRU is allowed to provide feedback. For example, the WTRU may be allowed to send the feedback if the received reference channel power is below a pre-defined value. Alternatively, the conventional HS-SCCH may be modified to include power control information related to the transmission of feedback over the shared feedback channel. Power offset or relative power command, (e.g., increase or decrease), bits may be introduced in the HS-SCCH to adjust the transmission power of the WTRU over the shared feedback channel. Optionally, the WTRU 100 may include channel quality information in the feedback.

An alternative scheme for sending a CQI via the P-RAFCH is disclosed hereinafter. A CQI is also transmitted via the P-RAFCH. While the CQI feedback may be either scheduled or triggered, the Node-B must be able to differentiate between NACK only feedback, CQI only feedback, and CQI feedback which is triggered by a NACK, (i.e., NACK+CQI). The P-RAFCH burst includes a data type indicator for indicating NACK only, CQI only or NACK+CQI, a data field for carrying CQI bits if needed, and a reference field for carrying a modulation phase and power reference, if needed.

These fields may be mapped into the burst by time division multiplexing (TDM), (i.e., each data is transmitted in its own time segment). Alternatively, the fields may be mapped into the burst by code division multiplexing (CDM), (e.g., a signature based structure as in the PRACH preamble). Alternatively, the fields may be mapped into the burst by frequency division multiplexing (FDM). FDM is particularly appropriate for systems, such as long term evolution (LTE), where a number of sub-carriers may be utilized. The basic physical channel resources for carrying these fields may be, but not necessarily, orthogonal at least at the WTRU.

The data field, if present, may use any multi-dimensional modulation schemes with each physical channel resource (time slot, signature, carrier, etc.) providing a dimension in the modulation vector space. Some examples of possible modulation schemes are as follows:

(1) Multi-dimensional m-phase shift keying (PSK) (including binary phase shift keying (BPSK) (m=2), quadrature phase shift keying (QPSK) (m=4)), m is an integer power of 2. The number of physical channel resources required is $M/\log_2 m$, and additional phase and power reference is required.

(2) Multi-dimensional m-quadrature amplitude modulation (QAM) (including BPSK (m=2) and QPSK (m=4)), m is an integer power of 2. The number of physical channel resources required is $M/\log_2 m$, and additional phase and power reference is required.

(3) m-ary orthogonal modulation. The number of physical channel resources required is M (i.e., m=M), and additional phase and power reference is not needed.

(4) m-ary bi-orthogonal modulation. The number of physical channel resources required is M/2 (i.e., m=M/2), and additional phase and power reference is required.

(5) Multi-dimensional on-off keying, (i.e., M/2 carriers are either with or without power). The number of physical channel resources required is M/2, (i.e., m=M/2), and additional phase and power reference is not required.

The modulation scheme to be used should be signaled to the WTRU. Certain modulation schemes may require the use of a phase and power reference, while others do not. The reference, if required, may be sent together with the data type indicator. The data type indicator and the reference field may be sent on separate physical resources. Alternatively, only the data type indicator is sent and the reference field is derived from it using decisions feedback, (i.e., the data type indicator is assumed to be demodulated correctly, which permits its re-use as a reference signal).

Additionally, in order to avoid the explicit transmission of the data type indicator, a CQI may always be triggered by the need to transmit a NACK, (i.e., a NACK and a CQI are always sent together). Alternatively, if a NACK is sent and a CQI does not need to be sent, the data field corresponding to the highest CQI value may be used. These types of transmissions are referred to as an implicit data type format. The use of this format should be signaled to the WTRU.

The Node-B detects the presence of power over the complete burst. If power is detected in a burst space, and a data type indicator is used, the Node-B reads the data type indicator. If a CQI is present, the CQI is demodulated according to the modulation scheme used. If the implicit data type format is used, the presence of power indicates a NACK and a CQI transmission.

Because of the multicast nature of the transmissions and the need to serve most or all WTRUs, the Node-B may collect CQIs over some time period. The Node-B selects the minimum CQI over this time period and schedules data rates according to the minimum CQI. In this manner all WTRUs may be highly likely to be served.

This scheme does, however, have a disadvantage that a WTRU with a bad channel condition may significantly reduce the throughput of the whole system. The Node-B has no way to identify that such a WTRU exists in a direct way because all feedback from the WTRUs is anonymous. In order to solve this problem, the Node-B may collect statistics about CQI transmissions and may ignore any CQIs that are statistically very far from the majority. The Node-B may then select a minimum CQI from the remaining CQIs and uses that as a baseline.

Alternatively, the Node-B may select a certain small subset, (e.g., lower 20% or lower 10%), of CQIs after the removal of outliers. The Node-B may then use an average of these, (e.g. the actual average, a median, etc.). Because of the multicast nature, the highest CQIs are unlikely to have any impact on the system operation. Thus, the WTRU may not send the highest possible CQI value.

In another scheme, CQI signaling may also be implemented with 1-bit P-FRACH in the following manner. P-FRACH channel or channels may be defined for each allowed MCS that a WTRU may request. A WTRU may signal the channel that corresponds to the highest MCS it can support. The Node-B may then obtain an estimate of the distribution of desired CQI and choose the MCS of the next transmission.

Another embodiment of layer ⅔ (L⅔) based operation is disclosed hereinafter. A WTRU listens to network signaling which tells the WTRU 100 when, how often, and to whom to report feedback to the downlink shared service. The WTRU decodes signals on an allocated TTI for a shared downlink service. The WTRU then collects statistics of decoding success or failure rate and compares to the decoding statistics to a pre-defined threshold that is provided by the network. The WTRU sends feedback if the decoding statistics is worse than the pre-defined threshold.

If the WTRU has selected a Node-B out of several synchronized Node-Bs which transmit the same data, the WTRU transmits the feedback to that selected Node-B only. If the WTRU performs soft combining of signals from a plurality of Node-Bs in an active set, the WTRU sends the feedback to the strongest Node-B in the active set.

The network may indicate desired transmission of the NACK on a cell different from the one where the downlink shared service, (e.g., MBMS), is received. The cell is indicated by the network.

The downlink shared service may be mapped to a code that will be transmitted with the NACK. Alternatively WTRU connection ID may be signaled. Alternatively, if using a PRACH for the feedback, the physical channel access opportunities may be mapped to the downlink shared service. The mapping may be indicated by the network. If needed, CQI information may be transmitted together with the NACK or in its place. Since the signaling is at L⅔, a larger number of bits are supported in a straightforward fashion.

Some downlink shared services, (e.g., video), may use a layered QoS mechanism where certain users get higher throughput and quality than others. In a wireless system, an important factor that determines the QoS of a user is the throughput achievable given the location of the user in the system. The maximum throughput achievable at cell edge is typically less than the one achievable around the cell center. The layered QoS may be supported without feedback from dedicated physical channels.

One conventional layered QoS mechanism, (e.g., digital video broadcasting (DVB)), is based on hierarchical modulation. In hierarchical modulation, multiple data streams, (typically a high-priority and a low-priority), are modulated into a single signal that is received by all users. Users with good signal quality may decode both data streams while users with low signal quality may decode only the high-priority stream. For instance, the streams may be encoded as a 16 quadrature amplitude modulation (16QAM) signal. The quadrant where the signal is located represents two high priority bits whereas the position of the signal within the quadrant represents two low priority bits. Users with good signal quality are able to decode the signal as 16QAM while users with low signal quality can only decode the signal as quadrature phase shift keying (QPSK) and extract only the high priority bits.

In accordance with the embodiments, some new signaling is provided. From the network point of view, it would be unsatisfactory that all WTRUs report their ACK or NACK feedback based on decoding of the high priority stream only because it would lack information about the performance of favorably located WTRUs. On the other hand, having all WTRUs providing feedback based on decoding of all streams is also unsatisfactory because non-favorably located WTRUs would overload the P-RAFCH with NACK.

The network sets at least one CQI threshold to determine on which stream each WTRU should provide feedback. The CQI threshold(s) is signaled from the network, (e.g., on the BCCH, dedicated control channel (DCCH), or MBMS control channel (MCCH) for broadcast, multicast, or unicast).

A WTRU measures its own CQI (or average CQI). The WTRU compares the measured CQI to the CQI threshold(s) and determines the smallest CQI threshold higher than the measured CQI. This CQI threshold corresponds to a certain subset of stream(s) that the WTRU needs to report feedback. The WTRU reports ACK or NACK feedback on the decoding of the subset of stream(s) determined based on the CQI comparison. It is possible to further restrict the subset of streams to report feedback based on WTRU subscription to the high quality service.

A particular CQI threshold may be set below which the WTRU is not allowed to provide feedback. For example, in the case that there are only two streams, (high priority stream and low priority stream), and two CQI thresholds, (high CQI threshold and low CQI threshold), are set, if the measured CQI is above the high CQI threshold, the WTRU may report feedback on both high priority and low priority streams. If the measured CQI is below the high CQI threshold but above the low CQI threshold, the WTRU may report feedback on the high priority stream only. If the measured CQI is below the low CQI threshold, the WTRU may not provide feedback at all.

The Node-B may change the CQI threshold(s) from time to time based on load conditions. For instance, in case the load of the Node-B due to other services is low, the Node-B may allocate more resources to the downlink shared services and employ less aggressive MCS to encode the streams, which allows more WTRUs to enjoy high QoS. In case of high contention between the downlink shared services and other services, the Node-B may use more aggressive MCS to transmit the streams thereby reducing the amount of resources for the downlink shared services.

Alternatively, the multiple streams may be transmitted separately in different time or using different codes. For instance, a high priority stream may be transmitted with a less aggressive MCS while a low priority stream may be transmitted with a more aggressive MCS. This allows more flexibility in the selection of the MCS and CQI thresholds for decoding the streams. The disadvantage is that it is less efficient since the streams are not combined in the same signal.

It should be noted that although the feedback mechanism above is described in terms of CDMA systems, it is generic and may be applied to any wireless communication systems, and the physical channel, P-RAFCH, may be defined by a combination of any physical resources.

A method of counting the number of WTRUs which are listening to a particular Node-B transmission by using a contentions feedback channel, (such as P-RAFCH), will be explained hereafter. Suppose that there are a number (M) of WTRUs satisfying a configured criterion. The number of these WTRUs is counted by forcing each one of these WTRUs to send a signal, (e.g., ACK, NACK, PING, or the like), on the P-RAFCH.

In accordance with one embodiment, a particular physical resource, (such as subcarrier, code, timeslot, spatial stream, or combination of these), may be allocated for each WTRU and the number of physical resource that are actually used may be counted. This will generate a very accurate outcome ignoring communication error. However, it may be inefficient in terms of overhead because if there are a lot of WTRUs that may be present, a lot of physical resources are needed.

Alternatively, N physical resources may be reserved for the P-RAFCH that the WTRUs may access at random. The number of physical resources actually used is then counted, and the number of WTRUs (M) is estimated based on the number of used physical resources. While this estimate may not be precise, the error may be tolerable for many applications. The counting error depends on the number of available physical resources (M) and the number of WTRUs (M). The number of N physical resources that is needed for acceptable error may for example be obtained by solving following equation (4) for N:

$$M_{max} = \frac{c}{p} N \ln(N) \qquad \text{Equation (4)}$$

where $M_{max}$ is the number of WTRUs that may be present, $c>1$ is a tolerance factor, (e.g., $c=2$), and p is the probability with which a WTRU transmits on the P-RAFCH if the conditions for transmission are met, which will be described in detail below. For large $M_{max}$, N may be significantly lower than $M_{max}$ resulting in substantial reduction in signaling overhead in the uplink. Any other number of physical resources may be used depending on the acceptable error.

A P-RAFCH may be a physical channel that is defined by allocating one or more physical resources, (e.g., sub-carriers, codes, time-slots, spatial streams, or combination of all or some of these). One or N physical resources are reserved for the P-RAFCH for every predefined time interval. This predefined time interval may be referred to as a P-RAFCH frame. The P-RAFCH frame may correspond to a frame, super-frame, sub-frame, slot, etc. in different wireless communication standards. More than one P-RAFCH may be defined in a cell.

A "transmission criterion" (TC) may be defined for each P-RAFCH. A TC for a P-RAFCH may be at least one of the following, but not limited to:

(1) Successful reception of a data packet or a block of data on a particular downlink physical channel;

(2) Successful reception of a block of data on a particular data service (which may be spread across multiple channels);

(3) Reception of a particular signaling command;

(4) Occurrence of a measurement event; or (5) Failure to receive a particular transmission after a specified number of times.

A TC may yield a YES/NO answer, and each WTRU may be able to determine it independently without any external coordination.

Figure 6:
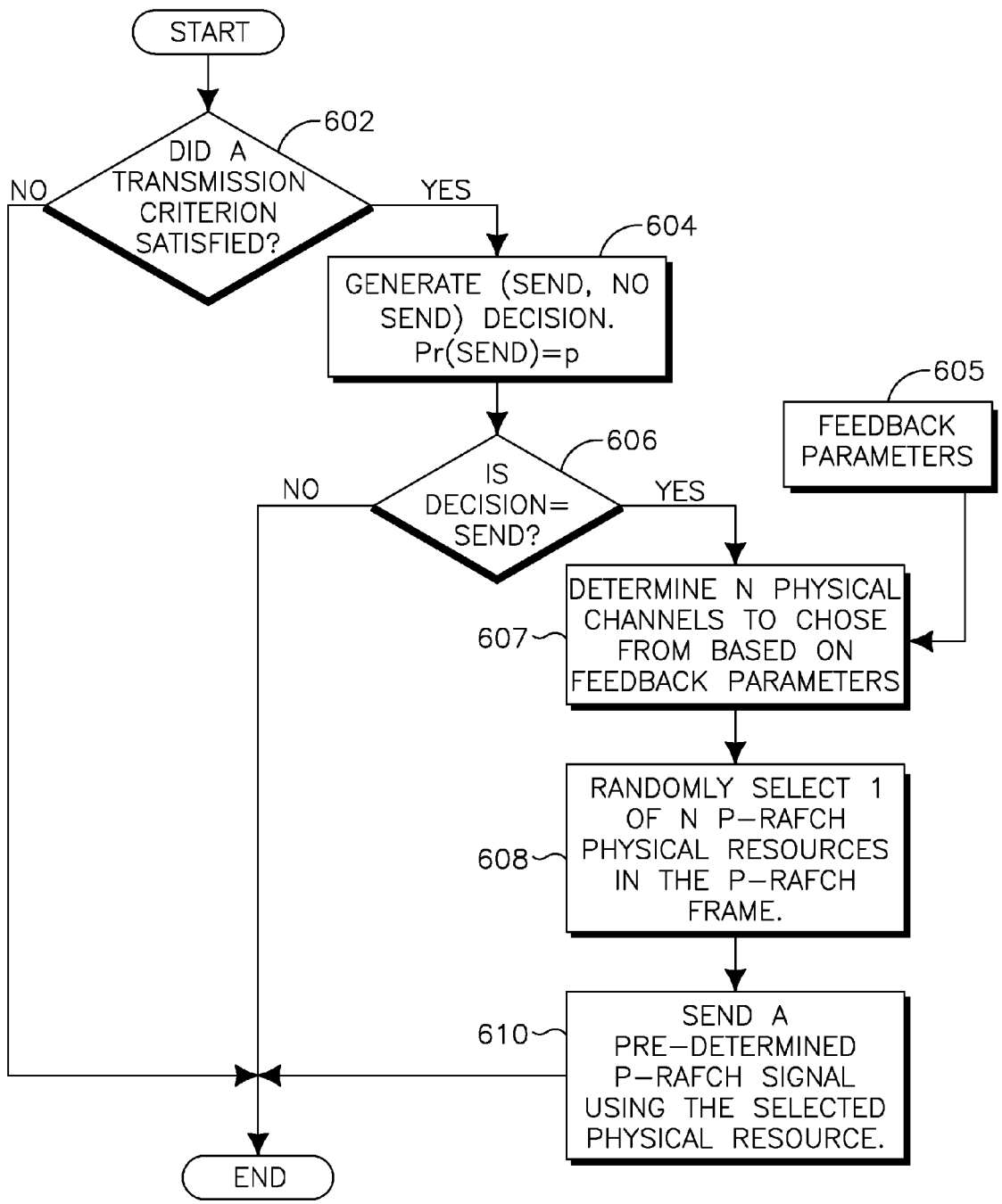
FIG. 6 shows an example flow diagram of an example process of evaluating a transmission criterion for transmitting a P-RAFCH.

FIG. 6 is a flow diagram of an example process 600 of evaluating a transmission criterion for transmitting a P-RAFCH. In each P-RAFCH frame for each P-RAFCH, a WTRU determines whether a TC associated with the P-RAFCH is satisfied (602). The TC associated with each P-RAFCH is provided as a part of P-RAFCH setup. If the TC has not been satisfied, the process 600 ends, (i.e., the WTRU does not transmit a P-RAFCH in this P-RAFCH frame). If the TC has been satisfied, the WTRU may optionally make a decision whether to send a P-RAFCH or not based on a preconfigured probability (p) of sending a P-RAFCH (604). The probability (p) may be set to '1' so that the WTRU may always send the signal once the TC is satisfied. If the WTRU decides not to send a P-RAFCH (606), the process ends, (i.e., the WTRU does not transmit a P-RAFCH in this P-RAFCH frame). If the WTRU decides to send a P-RAFCH (606), the WTRU determines N physical channels to choose from based on feedback parameters 605 (607). The WTRU may then randomly select one of N available P-RAFCH physical resources associated with the P-RAFCH (608). The WTRU then transmits a pre-defined signal using the selected physical resource (610). All WTRUs may transmit the same signal and the signal may be designed in such a way that collisions are unlikely to result in nulling of the signal, (e.g., a constant amplitude and phase).

In each P-RAFCH frame and for each P-RAFCH the Node-B estimates whether each physical resource was used, (e.g., using a signal detection scheme). The Node-B counts the number of used physical resources and estimates the number of WTRUs (M) accessed the P-RAFCH based on the number of used physical resources.

Many services and operational improvements are possible by using the number of WTRUs (counted or estimated). In some applications, a broadcast service transmits certain contents to users. The broadcaster may need to know how many users are listening to the channel, for example in order to enable the broadcaster to estimate how much to charge advertisers whose contents are broadcast on the same channel. In this case, it is not important to know who those listeners are, but only how many of them. To this effect the listeners are instructed to send a signal (PING).

In some applications of broadcast services, the network may wish to make sure that a service is available to at least a certain number or percentage of WTRUs in the cell. To ensure this, it needs to estimate the total number of WTRUs attempting to receive the service and how many of these are receiving it successfully. To do so, any two of the following three quantities are needed: the number of successful receptions (ACKs), the number of failures (NACKs), and the number of WTRUs present (PINGs). This may be accomplished by defining two P-RAFCHs for the service, (for example, one for ACKs and one for NACKs, or alternatively one for PINGs and one for ACKs or NACKs). Using a total count (PINGs) may be preferable as this quantity is likely to remain stable for a prolonged period of time and such a count may be requested periodically using a more general P-RAFCH for feedback.

In both broadcast and unicast unacknowledged services, (i.e., the services without dedicated feedback), the Node-B may wish to utilize several retransmissions to ensure proper data delivery. On the other hand, the Node-B may want to fine-tune the number of retransmissions to minimize the number of retransmissions while delivering appropriate quality of service (QoS) to at least some minimal number of WTRUs. The P-RAFCH may be used for this object by defining TC to be lack of successful decoding after a predetermined number of retransmissions. A WTRU attempts to decode data after every re-transmission, and if the WTRU fails after a predefined number of attempts, the WTRU sends a NACK on the P-RAFCH. By counting the NACKs and estimating the number of WTRUs which responded, the Node-B may appropriately select the number of retransmissions which minimizes air interface usage while meeting the required QoS. This mechanism may be used for adjusting power control for these types of services.

The method for estimating the number of WTRUs (M) based on the number of observed used physical resources out of a total of N physical resources in a P-RAFCH frame is explained in detail. It should be noted that this is not the only estimator that may be used, although the estimator M provides fairly good performance especially when M is likely to be quite large.

It is assumed that p=1, (i.e., a WTRU always transmits on a P-RAFCH if a TC is satisfied). It should be noted that setting p=1 is an example and p may be set differently. When p is not equal to '1', equation (8) below needs to be multiplied by a factor of 1/p. Because the generation of SEND/NO SEND decision for each WTRU is independent of other events, the analysis extends to other value of p: 0<p<1, by simply multiplying the estimator by a factor of 1/p.

Let T be the number of used physical resources in a P-RAFCH frame with a total of N physical resources. T is a random variable, $0 \leq T \leq N$. Based on this, the number of WTRUs that actually sent feedback is estimated, (i.e., count the WTRUs which sent an ACK).

The distribution of T given M is a distribution that when M agents picked one out of $N \geq 1$ objects (with replacement). Only T distinct objects are actually picked. The problem is closely related to the coupon collector problem, which is a standard combinatorial problem. The distribution is given as follows:

$$Pr\{T=t\} = \frac{N!}{(N-t)!} \frac{S(M,t)}{N^M}, 0 \leq t \leq \min(N, M), \quad \text{Equation (5)}$$

$$Pr\{T=t\} = 0$$

otherwise,
where S(M,T) is the Stirling number of the second kind:

$$S(M,t) = \frac{1}{t!} \sum_{j=0}^{t} (-1)^j \binom{t}{j} (t-j)^M. \quad \text{Equation (6)}$$

The distribution is quite complex. In particular, the maximum likelihood (ML) estimate is difficult to obtain as maximizing Equation (4) over M is difficult analytically or computationally. It is well known that asymptotically:

$$E[T] = N\left(1 - \left(1 - \frac{1}{N}\right)^M\right) \approx N(1 - e^{-M/N}). \quad \text{Equation (7)}$$

While equation (7) is accurate only asymptotically, it is good enough. From equation (7), the following approximate estimator may be used:

$$\hat{M}(t) = \frac{\ln\left(1 - \frac{t}{N}\right)}{\ln\left(1 - \frac{1}{N}\right)} \approx -N \ln\left(1 - \frac{t}{N}\right). \quad \text{Equation (8)}$$

The approximate estimator may be used instead of the exact one to save some complexity, if needed. It can be shown that equation (8) is the minimum variance unbiased estimator of M based on T.

If t=N, the estimate $\hat{M}(N)=\infty$. This makes intuitive sense in the view of an ML estimation, i.e., maximizing a posteriori likelihood. In case that all physical resources in the P-RAFCH frame have been used, the number of WTRUs that makes it most likely that this would happen should be infinite, absent any upper bound. Using this intuition, a design criterion is suggested for selecting an appropriate number of feedback slots, given a maximum expected number of WTRUs. Specifically, $$M_{max}(N) = -cN\ln\left(1 - \frac{N-1}{N}\right) = cN\ln(N), \qquad \text{Equation (9)}$$

which can be solved for N numerically given $M_{max}$ and c is an appropriately selected constant, which may even be set larger than 1. For example, c=2 would be a reasonable choice.

Described herein are example methods for managing group communications. The example methods disclose forming subscriber groups, signaling of group assignments, grouping physical channels, assigning logical or physical channels to subscriber groups, defining triggers for activating feedback channels and the like. These example methods may be used in a standalone manner or in combination with any of the methods described herein. Although the example methods may be illustrated with respect to E-MBS, the example methods are generally applicable to any form of multicast services, broadcast services, multimedia services, and the like. The example methods are also applicable to machine-to-machine (M2M) communications where confirmation of commands may be desired. The example methods described herein are applicable everywhere where channel information needs to be provided efficiently to a potentially large number of WTRUs.

In general, grouping of subscribers may be performed by multicast/broadcast service or by channel usage. The size of the group may take any integer number. For example, a group may be defined having a size of one (1), which may be equivalent to a dedicated channel. Alternatively, very large groups may be defined to support a very large number of subscribers.

In an example method, the subscribers to a multicast/broadcast service may be partitioned into subscriber groups. For example, the subscriber group may be defined for any use such as for negative acknowledgements, counting, or the like or for a specific use. Alternatively different subscriber groups may be defined for different uses.

Other features may further define the subscriber groups and/or its members. For example, the subscriber groups may have a minimum number of subscribers or WTRUs. Although WTRUs may be referred to herein, example methods and embodiments are equally applicable with respect to subscribers. In one instance, the minimum number of WTRUs per subscriber group may be set to one. In another example, a WTRU may belong to at least one subscriber group, but may belong to more than one subscriber group. Thus, for example, a WTRU may belong to subscriber groups defined for multiple services and for multiple uses per service.

In general, subscriber group assignment(s) for a WTRU may be signaled upon establishment of service, for example multicast/broadcast service, to the WTRU. The subscriber group assignment(s) may be changed later by the base station which transmits data of the multicast/broadcast service or the serving base station of the WTRU. Each WTRU may be specifically (i.e., unicast) signaled its subscriber group assignment. Alternatively, group membership may be implied by, for example, the received multicast/broadcast service or M2M command. Moreover, the physical channels that belong to a subscriber group may simply be signaled to each subscriber. In addition, certain cell parameters may be broadcast or unicast to the WTRU. Depending on the exact number of bits assigned to specific signaling fields, example methods may be flexible enough such that the base station may establish a non one-to-one mapping of physical (PHY) channels to subscriber groups. The base station may define the mapping in such a way that the mapping is one-to-one or where the resulting mapping ambiguity is beneficial.

Described herein is an overview of physical channel construction. For illustration purposes only, the description is in terms of the feedback channel but may be applicable to any channel. The feedback control region, such as the multicast/broadcast service feedback control region, is an uplink (UL) PHY control region that may consist of distinct sequences modulated on an integer number of subcarriers and integer number of orthogonal frequency-division multiple access (OFDMA) symbols in the UL subframe for OFDM/OFDMA technology, orthogonal sequences in a certain time slot for code divisional multiple access (CDMA) technology, or the like.

The feedback region may consist of physical feedback channels. In one example, the physical feedback channels may form an ordered set. In another example, the physical feedback channels may be grouped into logical channel groups. In a third example, physical feedback channels form an ordered set and are grouped. A group of physical feedback channels may be called a logical feedback channel. The logical feedback channel therefore, if used, is a property of the cell.

Described herein is an overview of channel assignments. In one example assignment method, one or more logical channels may be assigned to a subscriber group. In another example assignment method, one or more individual physical channels may be assigned to a subscriber group. Selection of the assignment method may depend on design parameters such as the number of subscriber groups and how dynamic the association of WTRU is to groups. The logical channels may be used in the case where a large number of subscriber groups exist, for example, to cover multiple multicast/broadcast services and usages. Both assignment methods are described herein below.

In general, trigger definitions for a WTRU to activate a channel, such as a feedback channel, may be user group specific, pre-defined or signaled by the base station. The WTRU may activate common channel transmission upon fulfillment of trigger conditions. The activated channel may be selected randomly from all physical channels assigned to the subscriber group, regardless of the method of assignment.

Figure 7:
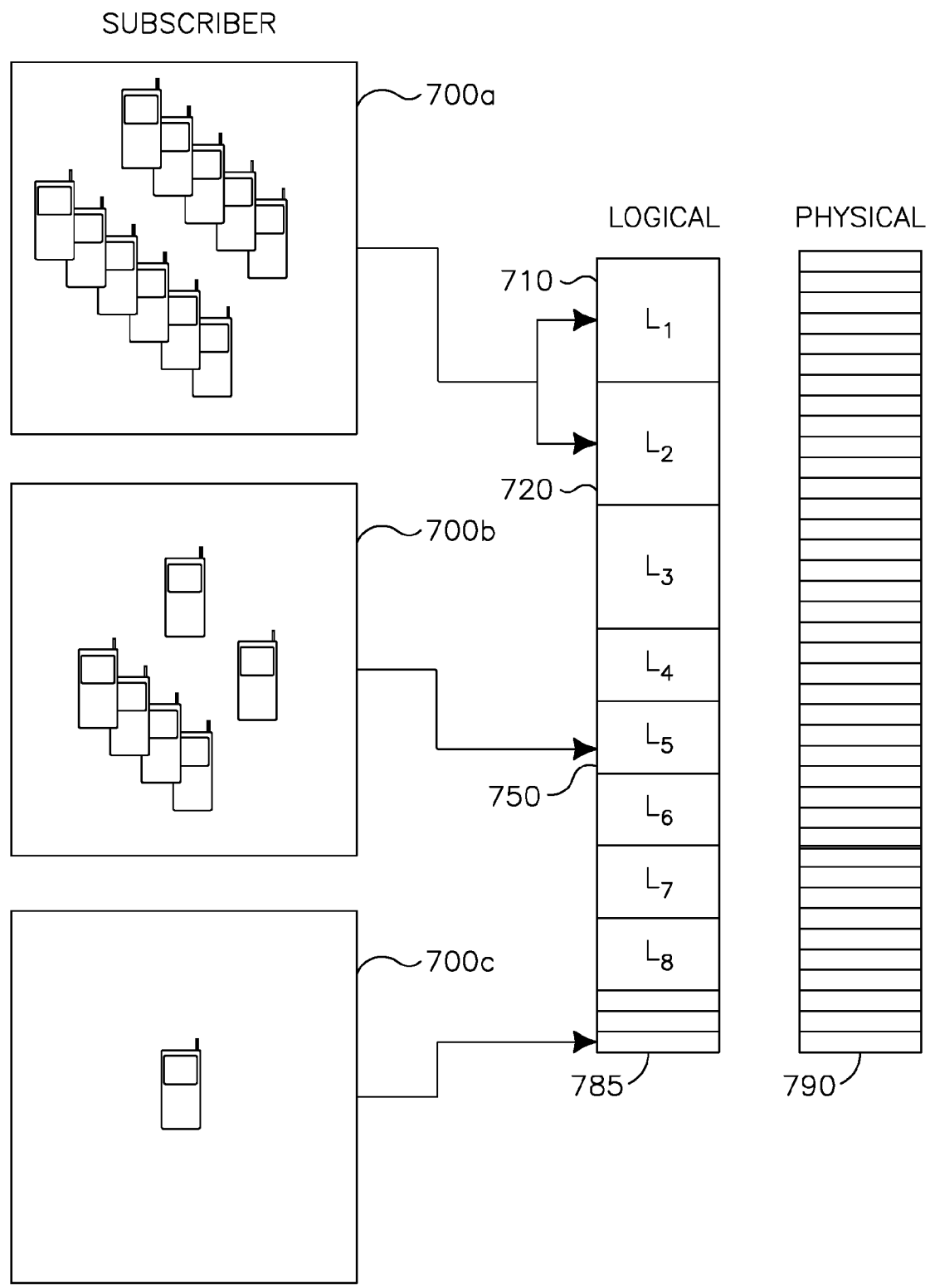
FIG. 7 shows an example mapping between subscribers and physical channels.

Described herein is an embodiment for user groups associated with logical multicast/broadcast channels. This embodiment may not have rigid links between the group and the number of physical channels assigned to it. Moreover, the physical channels may be signaled at any time using a few parameters. FIG. 7 illustrates the mapping between the subscribers and physical channels. In particular, shown are the relationships between subscriber group 700a, logical channels 710, 720 and physical channels 790; subscriber group 700b, logical channels 750 and physical channels 790; and subscriber group 700c, logical channels 785 and physical channels 790.

In this embodiment, the physical channels 790 may be an ordered set. The order may either be known or signaled to each WTRU using broadcast or unicast signaling. If, for example, the physical channels 790 are constructed with codes over sub-carriers in OFDM symbols (similar to an IEEE 802.16m random access or ranging preamble), then the set may be obtained by ordering the channels code-first or resource block-first, as desired. Other similar methods may be used to obtain the ordered set.

The logical channel to physical channel mapping may be defined using at least two methods. In a first example method, referred to as ordered logical channel size method, all logical channels may be arranged in an arbitrary but known order. For example, the logical channels may be arranged in a decreasing order with respect to their number of associated physical channels. An example of such an arrangement is defined in Table 1, which shows the number of logical channels per each logical channel size. The index of the logical channel, signaled to the WTRU, uniquely specifies the number and location of physical channels that belong to the logical channel.

TABLE 1

| Number of physical channels per each logical channel | Number of logical channels with defined number of physical channels |
| --- | --- |
| 16 | $L_{16}$ |
| 8 | $L_8$ |
| 4 | $L_4$ |
| 2 | $L_2$ |
| 1 | $L_1$ |

With knowledge of the above parameters and the logical channel assignment for the group ($l_1$, $l_2$, and so on), the WTRU may determine the exact physical channels as depicted in FIG. 7.

For example we may have $L_{16}=2$, $L_8=1$, $L_4=1$, $L_2=0$ and $L_1=3$. Then a logical channel sequence may be constructed as following: {(16) (16) (8) (4) (1) (1) (1)}. The number defined between the parenthesis (i.e., (.)) is the number of physical feedback channels in each logical channel (i.e., (16) states that there are 16 physical feedback channels in each logical channel, and (8) states that there are 8 physical feedback channels in each logical channel, etc.). Starting the index from zero, an index of two may, for this example, inform the WTRU to use physical channels 32-39. This may be illustrated as: index 0 equals positions 0-15 (the first "16"); index 1 equals positions 16-31 (the second "16"); and index 2 equals positions 32-39 (the "8" bits).

In a second example, referred to as the arbitrary logical channel size method, the logical channel may be arranged in an arbitrary order (i.e., not by size). Then, the mapping may be explicitly signaled, which may require higher overhead but may allow more flexibility. For example, a logical channel sequence may be: {16, 8, 8, 16, 4, 1, 2, 4}. Then, a logical channel index of two may tell the WTRU to use physical channels from 24 to 31. This may be illustrated as: index 0 equals positions 0-15 (the "16"); index 1 equals positions 16-23 (the first "8"); and index 2 equals positions 24-31 (the second "8" bits).

The base station may broadcast or signal specifically to the WTRU (i.e., unicast) when the WTRU subscribes to a service at least the following parameters: the broadcast or signal may include the multicast/broadcast physical channel parameters as applicable, for example, number of codes and number of subcarriers per resource group. Alternatively, the multicast/broadcast physical channel parameters may be standardized or predefined. The broadcast or signal may include ordered or arbitrary logical to physical channel mapping information, as defined above. It may further include the index of logical channel or channels assigned to each subscriber group (a single number per logical channel per subscriber group). Also included in the broadcast or signal may be the triggers for activation of each subscriber group. The base station may signal (i.e., unicast) to each WTRU its at least one subscriber group associations each time the WTRU subscribes to a service. Alternatively the subscriber group association is implied from the service and the mapping is broadcast.

To change the number of physical channels associated with any group, the base station may broadcast the logical channel assignment of the group as a logical channel index (single number) or may re-transmit Table 1 for the ordered case or the physical channel mapping sequence for the arbitrary case or both.

Described herein is an embodiment for user groups associated with physical feedback channels. In this embodiment, every user group may be associated with a set of physical feedback channels. The mapping may be arbitrary in which case it may have to be specifically listed. Alternatively, it may be ordered. For example, assuming an ordered set of physical feedback channels, one may define the number of physical feedback channels for each subscriber group according to Table 2, which defines the physical channels to subscriber group assignments. The Table 2 information may either be broadcast by the cell or signaled specifically to the WTRU. This definition uniquely defines a mapping between the subscriber group and a set of physical feedback channels.

The base station broadcasts or signals specifically to the WTRU (i.e., unicast) when the WTRU subscribes to a service. The broadcast or signal may include the physical channel parameters as applicable, for example, the number of codes and number of subcarriers per resource group. Alternatively, it may be standardized or predefined. Moreover, the information shown in Table 2 or its equivalent and the triggers for activation of each subscriber group may be broadcast or signaled to the WTRU.

TABLE 2

| Subscriber Group | Number of physical channels |
| --- | --- |
| 1 | N_1 |
| 2 | N_2 |
| 3 | N_3 |
| ... | ... |

In this embodiment, the subscriber group may act as the index to which number of physical channels may be used.

The base station unicasts to each WTRU its at least one subscriber group association(s) each time the WTRU subscribes to a service. As may be seen, changing the number of physical channels available to any group may require signaling the other groups.

Described herein is an embodiment where channel control based on grouping may not exist at least from the perspective of the WTRU. As in the other embodiments, physical channels exist and their location may be known or signaled to the WTRU.

Also as in the other embodiments, the base station may maintain subscriber groups as a means to logically determine the information provided by the feedback, scope the number of physical channels, and the like. In this embodiment, the WTRU may not be aware of such a grouping. The following information may be signaled to a WTRU during its service initialization: various triggers to activate the channel, and the assignment of the physical channels for each trigger. The assignment may either be a range of physical channel indexes or a set of physical channel indexes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base station comprising:
    a transceiver operatively coupled to a processor, the transceiver and the processor configured to provide multimedia broadcast multicast service (MBMS) data for transmission to groups of wireless transmit/receive units (WTRUs), wherein the WTRUs are divided into groups based on a respective MBMS service to be received by each respective group;
    the processor configured to assign a respective logical channel for the respective MBMS service of each respective group;
    the transceiver and the processor configured to transmit, to one of the groups, a group assignment message indicating physical resources for a transmission of MBMS data for the group's MBMS service; and
    the transceiver and the processor configured to transmit MBMS data of the group's MBMS service using the respective logical channel of the group using the indicated physical resources.

2. The base station of claim 1, wherein the indicated physical resources include subcarriers.

3. The base station of claim 1, wherein the indicated physical resources are used to transmit a single logical channel.

4. The base station of claim 1, wherein each respective group has a respective assigned group identification.

5. The base station of claim 1, wherein the base station is an eNode-B.

6. The base station of claim 1, wherein the processor and the transceiver are further configured to transmit the group assignment message as a logical channel index.

7. A method for use in a base station, the method comprising:
    providing, by the base station, multimedia broadcast multicast service (MBMS) data for transmission to groups of wireless transmit/receive units (WTRUs), wherein the WTRUs are divided into groups based on a respective MBMS service to be received by each respective group;
    assigning, by the base station, a respective logical channel for the respective MBMS service of each respective group;
    transmitting, by the base station, to one of the groups, a group assignment message indicating physical resources for a transmission of MBMS data for the group's MBMS service; and
    transmitting, by the base station, MBMS data of the group's MBMS service using the respective logical channel of the group using the indicated physical resources.

8. The method of claim 7, wherein the indicated physical resources include subcarriers.

9. The method of claim 7, wherein the indicated physical resources are used to transmit a single logical channel.

10. The method of claim 7, wherein each respective group has a respective assigned group identification.

11. The method of claim 7, wherein the base station is an eNode-B.

12. The method of claim 7, further comprising:
    transmitting, by the base station, the group assignment message as a logical channel index.

13. A wireless transmit/receive unit (WTRU), comprising:
    a transceiver operatively coupled to a processor, the processor and the transceiver configured to receive a group assignment message indicating physical resources for a transmission of MBMS data for an MBMS service for a group of WTRUs including the WTRU, wherein WTRUs are divided into groups based on a respective MBMS service to be received by each respective group and wherein a respective logical channel is assigned for the respective MBMS service of each respective group; and
    the processor and the transceiver configured to receive MBMS data of the group's MBMS service using the respective logical channel of the group using the indicated physical resources.

14. The WTRU of claim 13, wherein the indicated physical resources include subcarriers.

15. The WTRU of claim 13, wherein the indicated physical resources are used to transmit a single logical channel.

16. The WTRU of claim 13, wherein each respective group has a respective assigned group identification.

17. The WTRU of claim 13, wherein the processor and the transceiver are further configured to receive the group assignment message as a logical channel index.

* * * * *